United States Patent [19]

Ziv et al.

[11] Patent Number: 5,867,527
[45] Date of Patent: Feb. 2, 1999

[54] METHOD OF SEARCHING FOR A BURSTY SIGNAL

[75] Inventors: Noam A. Ziv; Roberto Padovani; Jeffrey A. Levin; Kenneth D. Easton, all of San Diego, Calif.

[73] Assignee: Qualcomm Incorporated, San Diego, Calif.

[21] Appl. No.: 810,744

[22] Filed: Mar. 4, 1997

Related U.S. Application Data

[63] Continuation of Ser. No. 436,029, May 5, 1995, Pat. No. 5,710,768, which is a continuation-in-part of Ser. No. 316,177, Sep. 30, 1994.

[51] Int. Cl.$^6$ .............................. H04B 15/00; H04K 1/00; H04L 27/30
[52] U.S. Cl. ........................... 375/208; 370/342; 370/335
[58] Field of Search ..................................... 375/200, 206, 375/208, 205, 347; 370/342, 320, 335, 209; 455/67.1, 226.2–226.4

[56] References Cited

U.S. PATENT DOCUMENTS

| | | | |
|---|---|---|---|
| 5,109,390 | 4/1992 | Gilhousen et al. | 375/1 |
| 5,297,161 | 3/1994 | Ling | 375/200 |
| 5,412,686 | 5/1995 | Ling | 375/200 |
| 5,490,165 | 2/1996 | Blakeney, II et al. | 375/205 |
| 5,654,979 | 8/1997 | Levin et al. | 375/206 |
| 5,710,768 | 1/1998 | Ziv et al. | 375/208 |

*Primary Examiner*—Chi H. Pham
*Assistant Examiner*—Bryan Webster
*Attorney, Agent, or Firm*—Russell B. Miller; Bruce W. Greenhaus; Kent D. Baker

[57] ABSTRACT

An integrated search processor used in a modem for a spread spectrum communications system buffers receive samples and utilizes a time sliced transform processor operating on successive offsets from the buffer. The search processor autonomously steps through a search as configured by a microprocessor specified search parameter set, which can include the group of antennas to search over, the starting offset and width of the search window to search over, and the number of Walsh symbols to accumulate results at each offset. The search processor calculates the correlation energy at each offset, and presents a summary report of the best paths found in the search to use for demodulation element reassignment. The search is done in a linear fashion independent of the probability that a signal being searched for was transmitted at any given time.

6 Claims, 15 Drawing Sheets

METHOD OF SEARCHING FOR A BURSTY SIGNAL

This is a continuation of application Ser. No. 08/436,029, filed May 5, 1995, now U.S. Pat. No. 5,710,768 which is a continuation-in-part application of copending U.S. patent application Ser. No. 08/316,177, filed Sep. 30, 1994, entitled MULTIPATH SEARCH PROCESSOR FOR A SPREAD SPECTRUM MULTIPLE ACCESS COMMUNICATION SYSTEM. The present invention relates generally to spread spectrum communication systems and, more particularly, to signal processing in a cellular telephone communication system.

BACKGROUND OF THE INVENTION

I. Field of the Invention

II. Description of the Related Art

In a wireless telephone communication system such as cellular telephone systems, personal communications systems, and wireless local loop system, many users communicate over a wireless channel to connect to wireline telephone systems. Communication over the wireless channel can be one of a variety of multiple access techniques which facilitate a large number of users in a limited frequency spectrum. These multiple access techniques include time division multiple access (TDMA), frequency division multiple access (FDMA), and code division multiple access (CDMA). The CDMA technique has many advantages and an exemplary CDMA system is described in U.S. Pat. No. 4,901,307 issued Feb. 13, 1990 to K. Gilhousen et al., entitled "SPREAD SPECTRUM MULTIPLE ACCESS COMMUNICATION SYSTEM USING SATELLITE OR TERRESTRIAL REPEATERS," assigned to the assignee of the present invention and incorporated herein by reference.

In the just mentioned patent, a multiple access technique is disclosed where a large number of mobile telephone system users, each having a transceiver, communicate through satellite repeaters or terrestrial base stations using CDMA spread spectrum communication signals. In using CDMA communications, the frequency spectrum can be reused multiple times thus permitting an increase in system user capacity.

The CDMA modulation techniques disclosed in U.S. Pat. No. 4,901,307 offer many advantages over narrow band modulation techniques used in communication systems using satellite or terrestrial channels. The terrestrial channel poses special problems to any communication system particularly with respect to multipath signals. The use of CDMA techniques permits the special problems of the terrestrial channel to be overcome by mitigating the adverse effect of multipath, e.g. fading, while also exploiting the advantages thereof.

The CDMA techniques as disclosed in U.S. Pat. No. 4,901,307 contemplate the use of coherent modulation and demodulation for both directions of the link in remote unit-satellite communications. Accordingly, disclosed therein is the use of a pilot carrier signal as a coherent phase reference for the satellite-to-remote unit link and the base station-to-remote unit link. In the terrestrial cellular environment, however, the severity of multipath fading with the resulting phase disruption of the channel, as well as the power required to transmit a pilot carrier signal from the remote unit, precludes usage of coherent demodulation techniques for the remote unit-to-base station link. U.S. Pat. No. 5,103,459 entitled "SYSTEM AND METHOD FOR GENERATING SIGNAL WAVEFORMS IN A CDMA CELLULAR TELEPHONE SYSTEM", issued Jun. 25, 1990, assigned to the assignee of the present invention, the disclosure of which is incorporated by this reference, provides a means for overcoming the adverse effects of multipath in the remote unit-to-base station link by using noncoherent modulation and demodulation techniques.

In a CDMA cellular telephone system, the same frequency band can be used for communication in all base stations. At the base station receiver, separable multipath, such as a line of site path and another path reflecting off of a building, can be diversity combined for enhanced modem performance. The CDMA waveform properties that provide processing gain are also used to discriminate between signals that occupy the same frequency band. Furthermore, the high speed pseudonoise (PN) modulation allows many different propagation paths of the same signal to be separated, provided the difference in path delays exceeds the PN chip duration. If a PN chip rate of approximately 1 MHz is employed in a CDMA system, the full spread spectrum processing gain, equal to the ratio of the spread bandwidth to the system data rate, can be employed against paths having delays that differ by more than one microsecond. A one microsecond path delay differential corresponds to differential path distance of approximately 300 meters. The urban environment typically provides differential path delays in excess of one microsecond.

The multipath properties of the terrestrial channel produce at the receiver signals having traveled several distinct propagation paths. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the radio channel, the multipath is created by reflection of the signal from obstacles in the environment, such as buildings, trees, cars, and people. In general the radio channel is a time varying multipath channel due to the relative motion of the structures that create the multipath. For example, if an ideal impulse is transmitted over the time varying multipath channel, the received stream of pulses would change in time location, attenuation, and phase as a function of the time that the ideal impulse was transmitted.

The multipath characteristic of a channel can result in signal fading. Fading is the result of the phasing characteristics of the multipath channel. A fade occurs when multipath vectors are added destructively, yielding a received signal that is smaller than either individual vector. For example, if a sine wave is transmitted through a multipath channel having two paths where the first path has an attenuation factor of X dB, a time delay of δ with a phase shift of Θ radians, and the second path has an attenuation factor of X dB, a time delay of δ with a phase shift of Θ+π radians, no signal would be received at the output of the channel.

In narrow band modulation systems such as the analog FM modulation employed by conventional radio telephone systems, the existence of multiple paths in the radio channel results in severe multipath fading. As noted above with a wideband CDMA, however, the different paths may be discriminated in the demodulation process. This discrimination not only greatly reduces the severity of multipath fading but provides an advantage to the CDMA system.

Diversity is one approach for mitigating the deleterious effects of fading. It is therefore desirable that some form of diversity be provided which permits a system to reduce fading. Three major types of diversity exist: time diversity, frequency diversity, and space/path diversity.

Time diversity can best be obtained by the use of repetition, time interleaving, and error correction and detection coding which introduce redundancy. A system comprising the present invention may employ each of these techniques as a form of time diversity.

CDMA by its inherent wideband nature offers a form of frequency diversity by spreading the signal energy over a wide bandwidth. Therefore, frequency selective fading affects only a small part of the CDMA signal bandwidth.

Space and path diversity are obtained by providing multiple signal paths through simultaneous links from a remote unit through two or more base stations and by employing two or more spaced apart antenna elements at a single base station. Furthermore, path diversity may be obtained by exploiting the multipath environment through spread spectrum processing by allowing a signal arriving with different propagation delays to be received and processed separately as discussed above. Examples of path diversity are illustrated in U.S. Pat. No. 5,101,501 entitled "SOFT HAND-OFF IN A CDMA CELLULAR TELEPHONE SYSTEM", issued Mar. 21, 1992 and U.S. Pat. No. 5,109,390 entitled "DIVERSITY RECEIVER IN A CDMA CELLULAR TELEPHONE SYSTEM", issued Apr. 28, 1992, both assigned to the assignee of the present invention.

The deleterious effects of fading can be further controlled to a certain extent in a CDMA system by controlling transmitter power. A system for base station and remote unit power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM", issued Oct. 8, 1991, also assigned to the assignee of the present invention.

The CDMA techniques as disclosed in U.S. Pat. No. 4,901,307 contemplate the use of relatively long PN sequences with each remote unit user being assigned a different PN sequence. The cross-correlation between different PN sequences and the autocorrelation of a PN sequence, for all time shifts other than zero, both have a nearly zero average value which allows the different user signals to be discriminated upon reception. (Autocorrelation and cross-correlation requires logical "0" take on a value of "1" and logical "1" take on a value of "−1" or a similar mapping in order that a zero average value be obtained.)

However, such PN signals are not orthogonal. Although the cross-correlation essentially averages to zero over the entire sequence length, for a short time interval, such as an information bit time, the cross-correlation is a random variable with a binomial distribution. As such, the signals interfere with each other in much the same way as they would if they were wide bandwidth Gaussian noise at the same power spectral density. Thus the other user signals, or mutual interference noise, ultimately limits the achievable capacity.

It is well known in the art that a set of n orthogonal binary sequences, each of length n, for n any power of 2 can be constructed, see *Digital Communications with Space Applications,* S. W. Golomb et al., Prentice-Hall, Inc., 1964, pp. 45–64. In fact, orthogonal binary sequence sets are also known for most lengths which are multiples of four and less than two hundred. One class of such sequences that is easy to generate is called the Walsh function, also known as Hadamard matrices.

A Walsh function of order n can be defined recursively as follows:

$$W(n) = \begin{vmatrix} W(n/2), & W(n/2) \\ W(n/2), & W'(n/2) \end{vmatrix}$$

where W' denotes the logical complement of W, and W(1) =|0|.
Thus, $$W(2) = \begin{vmatrix} 0, 0 \\ 0, 1 \end{vmatrix},$$

$$W(4) = \begin{vmatrix} 0, 0, 0, 0 \\ 0, 1, 0, 1 \\ 0, 0, 1, 1 \\ 0, 1, 1, 0 \end{vmatrix}, \text{and}$$

$$W(8) = \begin{vmatrix} 0, 0, 0, 0, 0, 0, 0, 0 \\ 0, 1, 0, 1, 0, 1, 0, 1 \\ 0, 0, 1, 1, 0, 0, 1, 1 \\ 0, 1, 1, 0, 0, 1, 1, 0 \\ 0, 0, 0, 0, 1, 1, 1, 1 \\ 0, 1, 0, 1, 1, 0, 1, 0 \\ 0, 0, 1, 1, 1, 1, 0, 0 \\ 0, 1, 1, 0, 1, 0, 0, 1 \end{vmatrix}.$$

A Walsh symbol, sequence, or code is one of the rows of a Walsh function matrix. A Walsh function matrix of order n contains n sequences, each of length n Walsh chips. Each Walsh code has a corresponding Walsh index where the Walsh index refers to the number (1 through n) corresponding to the row in which a Walsh code is found. For example, for n=8 Walsh function matrix given above, the all zeroes row corresponds to Walsh index 1 and the Walsh code 0, 0, 0, 0, 1, 1, 1, 1 corresponds to Walsh index 5.

A Walsh function matrix of order n (as well as other orthogonal functions of length n) has the property that over the interval of n bits, the cross-correlation between all the different sequences within the set is zero. This can be seen by noting that every sequence differs from every other sequence in exactly half of its bits. It should also be noted that there is always one sequence containing all zeroes and that all the other sequences contain half ones and half zeroes. The Walsh symbol which consists all logical zeros instead of half one's and zero's is called the Walsh zero symbol.

On the reverse link channel from the remote unit to the base station, no pilot signal exists to provide a phase reference. Therefore a method is needed to provide a high-quality link on a fading channel having a low Eb/No (energy per bit/noise power density). Walsh function modulation on the reverse link is a simple method of obtaining 64-ary modulation with coherence over the set of six code symbols mapped into the 64 Walsh codes. The characteristics of the terrestrial channel are such that the rate of change of phase is relatively slow. Therefore, by selecting a Walsh code duration which is short compared to the rate of change of phase on the channel, coherent demodulation over the length of one Walsh code is possible.

On the reverse link channel, the Walsh code is determined by the information being transmitted from the remote unit. For example, a three bit information symbol could be mapped into the eight sequences of W(8) given above. An "unmapping" of the Walsh encoded symbols into an estimate of the original information symbols may be accomplished in the receiver by a Fast Hadamard Transform (FHT). A preferred "unmapping" or selection process produces soft decision data which can be provided to a decoder for maximum likelihood decoding.

An FHT is used to perform the "unmapping" process. An FHT correlates the received sequence with each of the possible Walsh sequences. Selection circuitry is employed to select the most likely correlation value, which is scaled and provided as soft decision data.

A spread spectrum receiver of the diversity or "rake" receiver design comprises multiple data receivers to mitigate the effects of fading. Typically each data receiver is assigned to demodulate a signal which has traveled a different path, either through the use of multiple antennas or due to the multipath properties of the channel. In the demodulation of signals modulated according to an orthogonal signaling scheme, each data receiver correlates the received signal with each of the possible mapping values using an FHT. The FHT outputs of each data receiver are combined and selection circuitry then selects the most likely correlation value based on the largest combined FHT output to produce a demodulated soft decision symbol.

In the system described in the U.S. Pat. No. 5,103,459, the call signal begins as a 9600 bit per second information source which is then converted by a rate ⅓ forward error correction encoder to a 28,800 symbols per second output stream. These symbols are grouped 6 at a time to form 4800 Walsh symbols per second, each Walsh symbol selecting one of sixty-four orthogonal Walsh functions that are sixty-four Walsh chips in duration. The Walsh chips are modulated with a user-specific PN sequence generator. The user-specific PN modulated data is then split into two signals, one of which is modulated with an in-phase (I) channel PN sequence and one of which is modulated with a quadrature-phase (Q) channel PN sequence. Both the I channel modulation and the Q channel modulation provide four PN chips per Walsh chip with a 1.2288 MHz PN spreading rate. The I and the Q modulated data are Offset Quadrature Phase Shift Keying (OQPSK) combined for transmission.

In the CDMA cellular system described in the above-referenced U.S. Pat. No. 4,901,307, each base station provides coverage to a limited geographic area and links the remote units in its coverage area through a cellular system switch to the public switched telephone network (PSTN). When a remote unit moves to the coverage area of a new base station, the routing of that user's call is transferred to the new base station. The base station-to-remote unit signal transmission path is referred to as the forward link and the remote unit-to-base station signal transmission path is referred to as the reverse link.

As described above, the PN chip interval defines the minimum separation two paths must have in order to be combined. Before the distinct paths can be demodulated, the relative arrival times (or offsets) of the paths in the received signal must first be determined. The channel element modem performs this function by "searching" through a sequence of potential path offsets and measuring the energy received at each potential path offset. If the energy associated with a potential offset exceeds a certain threshold, a signal demodulation element may be assigned to that offset. The signal present at that path offset can then be summed with the contributions of other demodulation elements at their respective offsets. A method and apparatus of demodulation element assignment based on searcher demodulation element energy levels is disclosed in co-pending U.S. patent application Ser. No. 08/144,902 entitled "DEMODULATION ELEMENT ASSIGNMENT IN A SYSTEM CAPABLE OF RECEIVING MULTIPLE SIGNALS," filed Oct. 28, 1993, assigned to the assignee of the present invention. Such a diversity or rake receiver provides for a robust digital link, because all paths have to fade together before the combined signal is degraded.

FIG. 1 shows an exemplary set of signals from a single remote unit arriving at the base station. The vertical axis represents the power received on a decibel (dB) scale. The horizontal axis represents the delay in the arrival time of a signal due to multipath delays. The axis (not shown) going into the page represents a segment of time. Each signal spike in the common plane of the page has arrived at a common time but was transmitted by the remote unit at a different time. In a common plane, peaks to the right were transmitted at an earlier time by the remote unit than peaks to the left. For example, the left-most peak spike 2 corresponds to the most recently transmitted signal. Each signal spike 2–7 has traveled a different path and therefore exhibits a different time delay and a different amplitude response. The six different signal spikes represented by spikes 2–7 are representative of a severe multipath environment. Typical urban environments produce fewer usable paths. The noise floor of the system is represented by the peaks and dips having lower energy levels. The task of a searcher element is to identify the delay as measured by the horizontal axis of signal spikes 2–7 for potential demodulation element assignment. The task of the demodulation element is to demodulate a set of the multipath peaks for combination into a single output. It is also the task of the demodulation elements once assigned to a multipath peak to track that peak as it may move in time.

The horizontal axis can also be thought of as having units of PN offset. At any given time, the base station receives a variety of signals from a single remote unit, each of which has traveled a different path and may have a different delay than the others. The remote unit's signal is modulated by a PN sequence. A copy of the PN sequence is also generated at the base station. At the base station, each multipath signal is individually demodulated with a PN sequence code aligned to its timing. The horizontal axis coordinates can be thought of as corresponding to the PN sequence code offset which would be used to demodulate a signal at that coordinate.

Note that each of the multipath peaks varies in amplitude as a function of time as shown by the uneven ridge of each multipath peak. In the limited time shown, there are no major changes in the multipath peaks. Over a more extended time range, multipath peaks disappear and new paths are created as time progresses. The peaks can also slide to earlier or later offsets as the path distances change as the remote unit moves around in the coverage area of the base station. Each demodulation element tracks small variations in the signal assigned to it. The task of the searching process is to generate a log of the current multipath environment as received by the base station.

In a typical wireless telephone communication system, the remote unit transmitter may employ a vocoding system which encodes voice information in a variable rate format. For example, the data rate may be lowered due to pauses in the voice activity. The lower data rate reduces the level of interference to other users caused by the remote unit transmissions. At the receiver, or otherwise associated with the receiver, a vocoding system is employed for reconstructing the voice information. In addition to voice information, non-voice information alone or a mixture of the two may be transmitted by the remote unit.

A vocoder which is suited for application in this environment is described in copending U.S. patent application Ser. No. 08/363,170, entitled "VARIABLE RATE VOCODER," filed Dec. 23, 1994 and assigned to the assignee of the present invention. This vocoder produces from digital samples of the voice information encoded data at four different rates, e.g. approximately 8,000 bits per second (bps), 4,000 bps, 2,000 bps and 1,000 bps, based on voice activity during a 20 millisecond (ms) frame. Each frame of vocoder data is formatted with overhead bits as 9,600 bps, 4,800 bps, 2,400 bps, and 1,200 bps data frames. The highest rate data frame which corresponds to a 9,600 bps frame is referred to as a "full rate" frame; a 4,800 bps data frame is referred to as a "half rate" frame; a 2,400 bps data frame is referred to as a "quarter rate" frame; and a 1,200 bps data frame is referred to as an "eighth rate" frame. In neither the encoding process nor the frame formatting process is rate information included in the data. When the remote unit transmits data at less than full rate, the duty cycle of the remote units transmitted signal is the same as the data rate. For example, at quarter rate a signal is transmitted from the remote unit only one quarter of the time. During the other three quarters time, no signal is transmitted from the remote unit.

The remote unit includes a data burst randomizer. The data burst randomizer determines during which time periods the remote unit transmits and during which time periods it does not transmit given the data rate of the signal to be transmitted, a remote unit specific identifying number, and the time of day. When operating at less than full rate, the data burst randomizer within the remote unit pseudorandomly distributes the active time periods within the transmission burst. A corresponding data burst randomizer is also included in the base station such that the base station can recreate the pseudorandom distribution based on the time of day and the remote unit specific identifying number but the base station is unaware, a priori, of the data rate of the transmitted signal.

The eighth rate time periods determine a so called worthy group of time periods. A remote unit operating at quarter rate transmits during the worthy group time periods and another set of pseudorandomly distributed periods. A remote unit operating in half rate transmits during the quarter rate time periods and another set of pseudorandomly distributed periods. A remote unit operating in full rate transmits continually. In this way, regardless of the data rate of the transmitted signal, each time period corresponding to the worthy group is sure to correspond to a time when the corresponding remote unit is transmitting a signal. Further details on the data burst randomizer are described in copending U.S. patent application Ser. No. 08/291,647, entitled "DATA BURST RANDOMIZER," filed Aug. 16, 1994, and assigned to the assignee of the present invention.

To conserve system resources for actual data of voice transmissions, the remote unit does not transmit the rate for each frame. Therefore, the receiver must determine the rate at which the data was encoded and transmitted based on the received signal so that the receiver associated vocoder can properly reconstruct the voice information. A method of determining the rate at which burst data was encoded without receiving rate information from the transmitter is disclosed in co-pending U.S. patent Ser. No. 08/233,570, entitled "METHOD AND APPARATUS FOR DETERMINING DATA RATE OF TRANSMITTED VARIABLE RATE DATE IN A COMMUNICATIONS RECEIVER" filed Apr. 26, 1994, and assigned to the assignee of the present invention. The method of determining data rate disclosed in the above mentioned patent application is performed after the signal has been received and demodulated therefore the rate information is not available during the searching process.

At the base station, each individual remote unit signal must be identified from the ensemble of call signals received. A system and method for demodulating a remote unit signal received at a base station is described, for example, in U.S. Pat. No. 5,103,459. FIG. 2 is a block diagram of the base station equipment described in U.S. Pat. No. 5,103,459 for demodulating a reverse link remote unit signal.

A typical prior art base station comprises multiple independent searcher and demodulation elements. The searcher and demodulation elements are controlled by a microprocessor. In this exemplary embodiment, to maintain a high system capacity, each remote unit in the system does not transmit a pilot signal. The lack of a pilot signal on the reverse link increases the time needed to conduct a survey of all possible time offsets at which a remote unit signal may be received. Typically, a pilot signal is transmitted at a higher power than the traffic bearing signals thus increasing the signal to noise ratio of the received pilot signal as compared to the received traffic channel signals. In contrast, ideally each remote unit transmits a reverse link signal which arrives with a power level equal to the power level received from every other remote unit therefore having a low signal to noise ratio. Also, a pilot channel transmits a known sequence of data. Without the pilot signal, the searching process must examine all possibilities of what data may have been transmitted.

FIG. 2 shows an exemplary embodiment of a prior art base station. The base station of FIG. 2 has one or more antennas 12 receiving CDMA reverse link remote unit signals 14. Typically, an urban base station's coverage area is split into three sub-regions called sectors. With two antennas per sector, a typical base station has a total of six receive antennas. The received signals are down-converted to baseband by analog receiver 16 that quantizes the received signal I and Q channels and sends these digital values over signal lines 18 to channel element modem 20. A typical base station comprises multiple channel element modems like channel element modem 20 (not shown in FIG. 2). Each channel element modem 20 supports a single user. In the preferred embodiment, channel element modem 20 comprises four demodulation elements 22 and eight searchers 26. Microprocessor 34 controls the operation of demodulation elements 22 and searchers 26. The user PN code in each demodulation element 22 and searcher 26 is set to that of the remote unit assigned to that channel element modem 20. Microprocessor 34 steps searchers 26 through a set of offsets, called a search window, that is likely to contain multipath signal peaks suitable for assignment of demodulation elements 22. For each offset, searcher 26 reports the energy it finds at that offset to microprocessor 34. Demodulation elements 22 are then assigned by microprocessor 34 to the paths identified by searchers 26. Once one of demodulation elements 22 has locked onto the signal at its assigned offset, it then tracks that path on its own without supervision from microprocessor 34, until the path fades away or until it is assigned to a new path by microprocessor 34.

For the system of FIG. 2, each demodulation element 22 and searcher 26 contains one FHT processor 52 capable of performing one FHT transform during a time period equal to the period of a Walsh symbol. The FHT processor is slaved to "real time" in the sense that every Walsh symbol interval one value is input and one symbol value is output from the FHT. Therefore, to provide a rapid searching process, more than one searcher 26 must be used. Each of searchers 26 supplies back to microprocessor 34 the results of the search it performs. Microprocessor 34 tabulates these results for use in the assignment of demodulation elements 22 to the incoming signals.

In FIG. 2, the internal structure of only one demodulation element 22 is shown, but should be understood to apply to searchers 26 as well. Each demodulation element 22 or searcher 26 of the channel element modem has a corresponding I PN and Q PN sequence generator 36, 38 and the user-specific PN sequence generator 40 that is used to select a particular remote unit. User-specific PN sequence output 40 is XOR'd by XOR gates 42 and 44 with the output of I PN and Q PN sequence generators 36 and 38 to produce PN-I' and PN-Q' sequences that are provided to despreader 46. The timing reference of PN generators 36, 38, 40 is adjusted to the offset of the assigned signal, so that despreader 46 correlates the received I and Q channel antenna samples with the PN-I' and PN-Q' sequence consistent with the assigned signal offset. Four of the despreader outputs, corresponding to the four PN chips per Walsh chip, are summed to form a single Walsh chip by accumulators 48 and 50. The accumulated Walsh chip is then input into Fast Hadamard Transform (FHT) processor 52. When 64 chips corresponding to one Walsh symbol have been received, FHT processor 52 correlates the set of sixty-four Walsh chips with each of the sixty-four possible transmitted Walsh symbols and outputs a sixty-four entry matrix of soft decision data. The output of FHT processor 52 is then combined with those of other assigned demodulation elements by combiner 28. The output of combiner 28 is a "soft decision" demodulated symbol, weighted by the confidence that it correctly identifies the originally transmitted Walsh symbol. The soft decision data is then passed to forward error correction decoder 29 for further processing to recover the original call signal. This call signal is then sent through digital link 30, such as a T1 or E1 link, that routes the call to public switched telephone network (PSTN) 32.

Like each demodulation element 22, each searcher 26 contains a demodulation data path with an FHT processor capable of performing one FHT transform during a time period equal to the period of a Walsh symbol. Searcher 26 only differs from demodulation element 22 in how its output is used and in that it does not provide time tracking. For each offset processed, each searcher 26 finds the correlation energy at that offset by despreading the antenna samples, accumulating them into Walsh chips that are input to the FHT transform, performing the FHT transform and summing the maximum FHT output energy for each of the Walsh symbols for which the searcher dwells at an offset. The final sum is reported back to microprocessor 34. Generally each searcher 26 is stepped through the search window with the others as a group by microprocessor 34, each separated from its neighbor by half of a PN chip. In this way enough correlation energy exists at each maximum possible offset error of a quarter chip to ensure that a path is not missed because the searcher did not correlate with the exact offset of the path. After sequencing searchers 26 through the search window, microprocessor 34 evaluates the results reported back, looking for strong paths for demodulation elements assignment as described in above mentioned co-pending U.S. patent application Ser. No. 08/144,902.

The multipath environment is constantly changing as the remote unit and other reflective objects move about in the base station coverage area. The number of searches that must be performed is set by the need to find multipath quickly enough so that valid paths may be put to good use by the demodulation elements. On the other hand, the number of demodulation elements required is a function of the number of paths generally found to be usable at any point in time. To meet these needs, the system of FIG. 2 has two searchers 26 and one demodulation element 22 for each of four demodulator integrated circuits (IC's) used, for a total of four demodulation elements and eight searchers per channel element modem. Each of these twelve processing elements contains a complete demodulation data path, including the FHT processor which takes a relatively large, costly amount of area to implement on an integrated circuit. In addition to the four demodulator IC's the channel element modem also has a modulator IC and a forward error correction decoder IC for a total of 6 IC chips. A powerful and expensive microprocessor is needed to manage and coordinate the demodulation elements and the searchers. As implemented in FIG. 2, these circuits are completely independent and require the close guidance of microprocessor 34 to sequence through the correct offsets, and handle the FHT outputs. Every Walsh symbol microprocessor 34 receives an interrupt to process the FHT outputs. This interrupt rate alone necessitates use of a high powered microprocessor.

It would be advantageous if the six IC's required for a modem could be reduced to a single IC needing less microprocessor support, thereby reducing the direct IC cost and board-level production cost of the modem, and allowing migration to a lower cost microprocessor (or alternately a single high powered microprocessor supporting several channel element modems at once.) Just relying on shrinking feature sizes of the IC fabrication process and placing the six chips together on a single die is not enough. The fundamental architecture of the searcher needs to be redesigned for a truly cost effective single chip modem. From the discussion above, it should be apparent that there is a need for a signal receiving and processing apparatus that can demodulate a spread spectrum call signal at a lower cost and in a more architecturally efficient manner.

The present invention can use a set of real time searchers as described above or a single, integrated search processor that can quickly evaluate large numbers of offsets that potentially contain multipath of a received call signal.

The present invention is a method of searching for a multipath signal which is transmitted at an unknown variable rate and is subjected to power control.

SUMMARY OF THE INVENTION

The present invention is a method of searching for a multipath signal which is transmitted at an unknown variable rate and is subjected to power control. The searching method is linear in that no attempt is made to synchronize the searching process to time known to contain data. The searching process is aligned to power control group boundaries so that accurate power estimates can be made.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DESCRIPTION OF THE PREFERRED EMBODIMENT

In the following description of a method and system for processing telephone calls within a digital wireless telephone system, various references are made to processes and steps that are performed in order to achieve a desired result. It should be understood that such references do not describe human actions or thought, but are directed towards the operation, modification and transformation of various systems including and especially those systems which process electrical and electromagnetic signals and charges, optical signals, or a combination thereof. Fundamental to such systems is the use of various information storage devices, often referred to as "memory", which store information via the placement and organization of atomic or super-atomic charged particles on hard disk media or within silicon, gallium arsenic, or other semiconductor based integrated circuit media, and the use of various information processing devices, often referred to as "microprocessors," which alter their condition and state in response to such electrical and electromagnetic signals and charges. Memory and microprocessors that store and process light energy or particles having special optical characteristic, or a combination thereof, are also contemplated and use thereof is consistent with the operation of the described invention.

Figure 3:
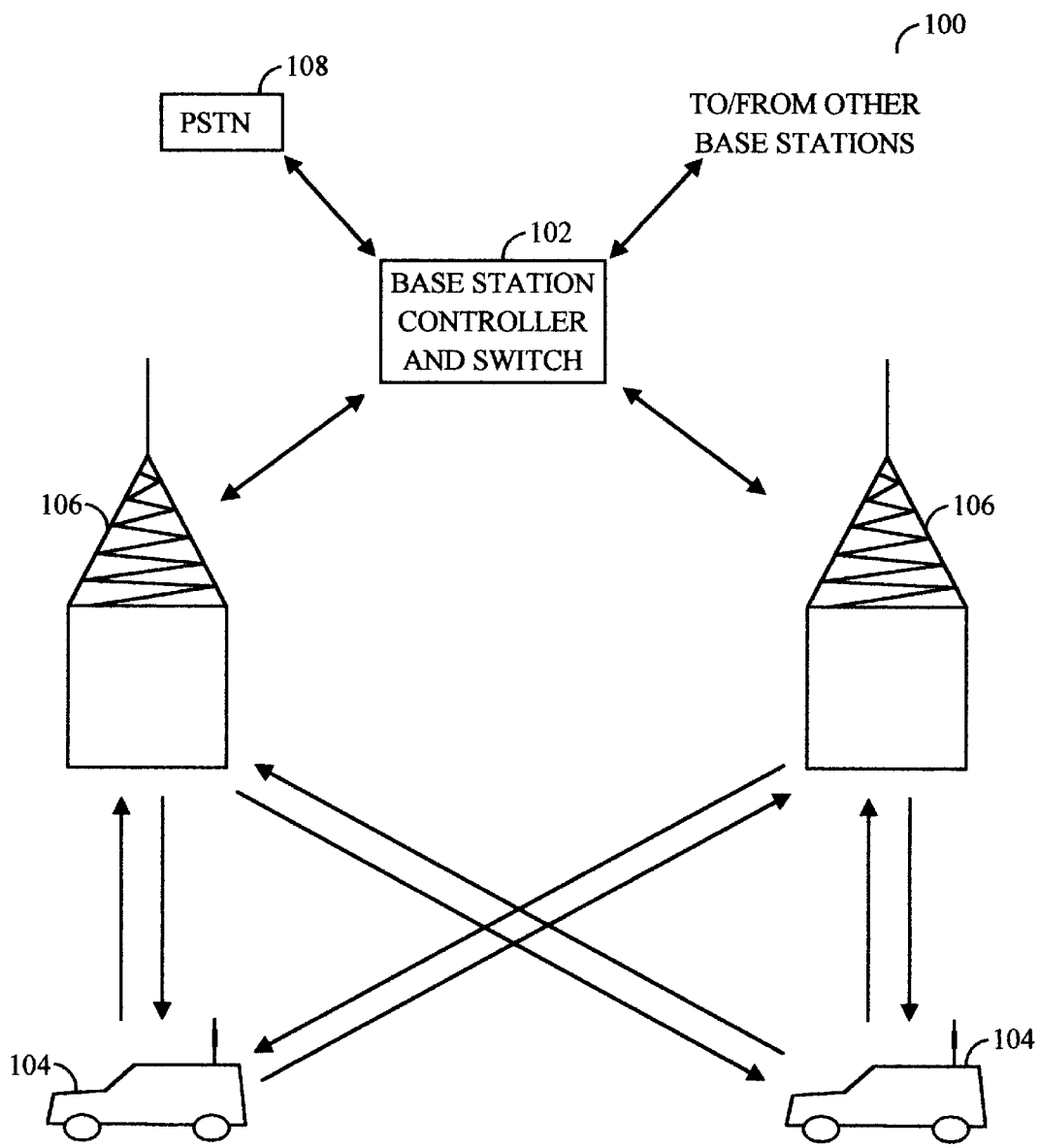
FIG. 3 represents an exemplary CDMA telecommunications system constructed in accordance with the present invention.

The present invention can be implemented in a wide variety of data transmission applications and in the preferred embodiment illustrated in FIG. 3 is implemented within system 100 for voice and data transmission in which system controller and switch (BSC&S) 102 performs interface and control functions to permit call communications with remote units 104 through base stations 106. BSC&S 102 controls the routing of calls between public switched telephone network (PSTN) 108 and base stations 106 for transmission to and from remote units 104.

Figure 4:
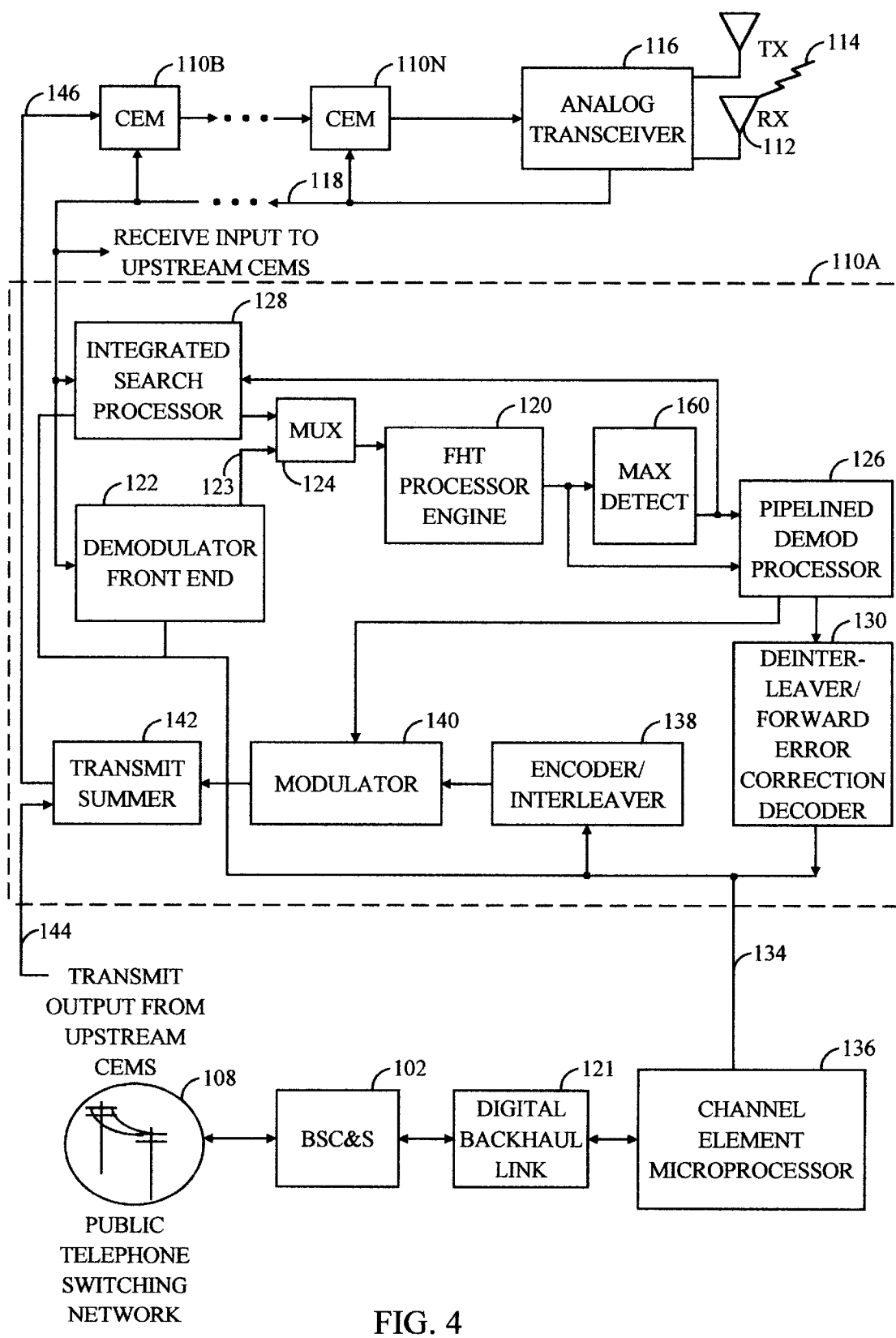
FIG. 4 is a block diagram of a channel element modem constructed in accordance with the present invention.

FIG. 4 illustrates channel element modems 110A–110N and other elements of the base station infrastructure operating in accordance with the CDMA methods and data formats described in the above-referenced patents. A plurality of antennas 112 provides received reverse link signal 114 to analog transmitter receiver (transceiver) 116. Analog transceiver 116 down-converts reverse link signal 114 to baseband and samples the baseband waveform at eight times the PN chip rate of the CDMA received signal as defined above. Analog transceiver 116 provides the digital antenna samples to channel element modems 110A–110N through base station RX backplane signal 118. Each channel element modem 110A–110N may be assigned to one remote unit having an active communication established with the base station. Each channel element modem 110A–110N is nearly identical in structure.

When channel element modem 110A is assigned to an active call, demodulator front end 122 and integrated search processor 128 isolate a signal from the corresponding remote unit from the plurality of call signals contained in reverse link signal 114 by use of the PN sequences as described in the above referenced patents and patent applications. Channel element modem 110A includes single integrated search processor 128 to identify multipath signals that can be used by demodulator front end 122. In the preferred embodiment, time sliced FHT processor engine 120 services both integrated search processor 128 and demodulator front end 122. Other than sharing FHT processor engine 120 and related max detect block 160, integrated search processor 128, is stand-alone, self-controlled, and self-contained. A searching architecture is detailed in a co-pending U.S. patent application Ser. No. 08/316,177 entitled "MULTIPATH SEARCH PROCESSOR FOR A SPREAD SPECTRUM MULTIPLE ACCESS COMMUNICATION SYSTEM" filed Sep. 30, 1994, and assigned to the assignee of the present invention.

FHT processor engine 120 is the core of the demodulation process. In the preferred embodiment, FHT processor engine 120 correlates the received Walsh symbol values with each of the possible Walsh symbols that may have been transmitted by the remote unit. FHT processor engine 120 outputs a correlation energy corresponding to each possible Walsh symbol where a higher correlation energy level corresponds to a higher likelihood that the symbol corresponding to that Walsh index was communicated by the remote unit. Max detect block 160 then determines the largest of the 64 FHT transform energy outputs. The maximum correlation energy and the corresponding Walsh index from max detect block 160 and each of the 64 correlation energy output from FHT processor engine 120 are passed to pipelined demodulator processor 126 for further signal processing. The maximum correlation energy and the corresponding Walsh index from max detect block 160 are passed back to integrated search processor 128.

Pipelined demodulator processor 126 time aligns and combines symbol data received at different offsets into a single demodulated "soft decision" symbol stream. In addition, pipelined demodulator processor 126 calculates the power level of the signal being received. From the received power level a power control indication is created to command the remote unit to raise or lower the remote unit's transmit power. The power control indication is passed through modulator 140 which adds the indication to the base station transmitted signal for reception by the remote unit. This power control loop operates under the method described in U.S. Pat. No. 5,056,109 referenced above.

The soft decision symbol stream from pipelined demodulator processor 126 is output to deinterleaver/forward error correction decoder 130 where it is deinterleaved and decoded. Channel element microprocessor 136 supervises the entire demodulation procedure and obtains the recovered data from deinterleaver/forward error correction decoder 130 via microprocessor bus interface 134. The data is then routed through digital backhaul link 121 to BSC&S 102 which connects the call through PSTN 108.

The forward link data path proceeds much as the inverse of the functions just presented for the reverse link. The signal is provided from PSTN 108 through BSC&S 102 and to digital backhaul 121. Digital backhaul 121 provides input to encoder/interleaver 138 through channel element microprocessor 136. After encoding and interleaving the data, encoder/interleaver 138 passes the data to modulator 140 where it is modulated as disclosed in the above referenced patents. Output 146 of modulator 140 is passed to transmit summer 142 where it is added to the outputs of other channel element modems 110B–110N prior to being up converted from baseband and amplified in analog transmitter receiver 116. A summing method is disclosed in a co-pending U.S. patent application Ser. No. 08/316,156 entitled "SERIAL LINKED INTERCONNECT FOR THE SUMMATION OF MULTIPLE DIGITAL WAVEFORMS," filed Sep. 30, 1994, and assigned to the assignee of the present invention. As presented in the above referenced patent application, the transmit summer corresponding to each of channel element modems 110A–110N can be cascaded in a daisy-chain fashion eventually resulting in a final sum that is provided to analog transceiver 116 for broadcasting.

Figure 2:
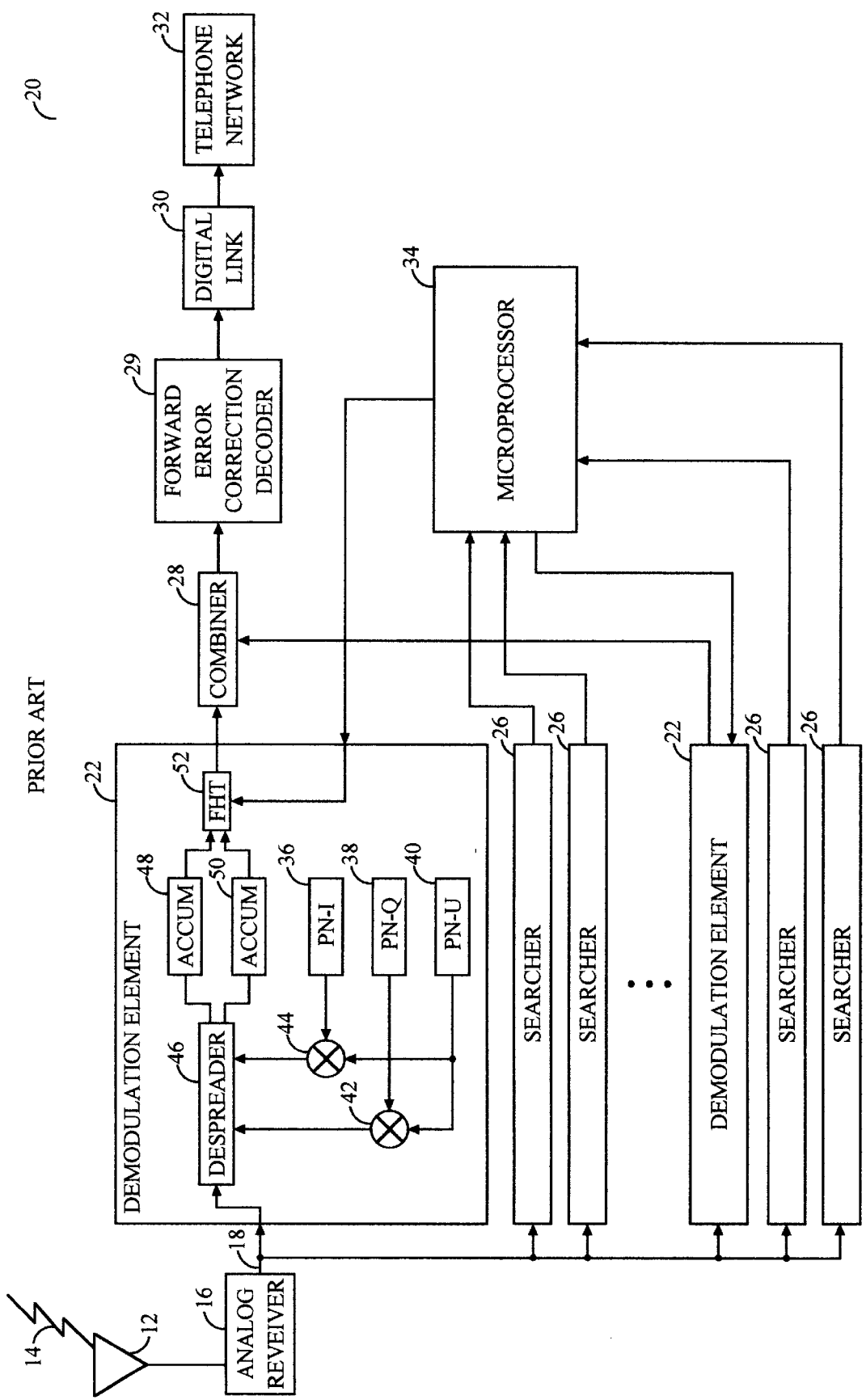
FIG. 2 is a block diagram of a prior art communications network demodulation system.
Figure 5:
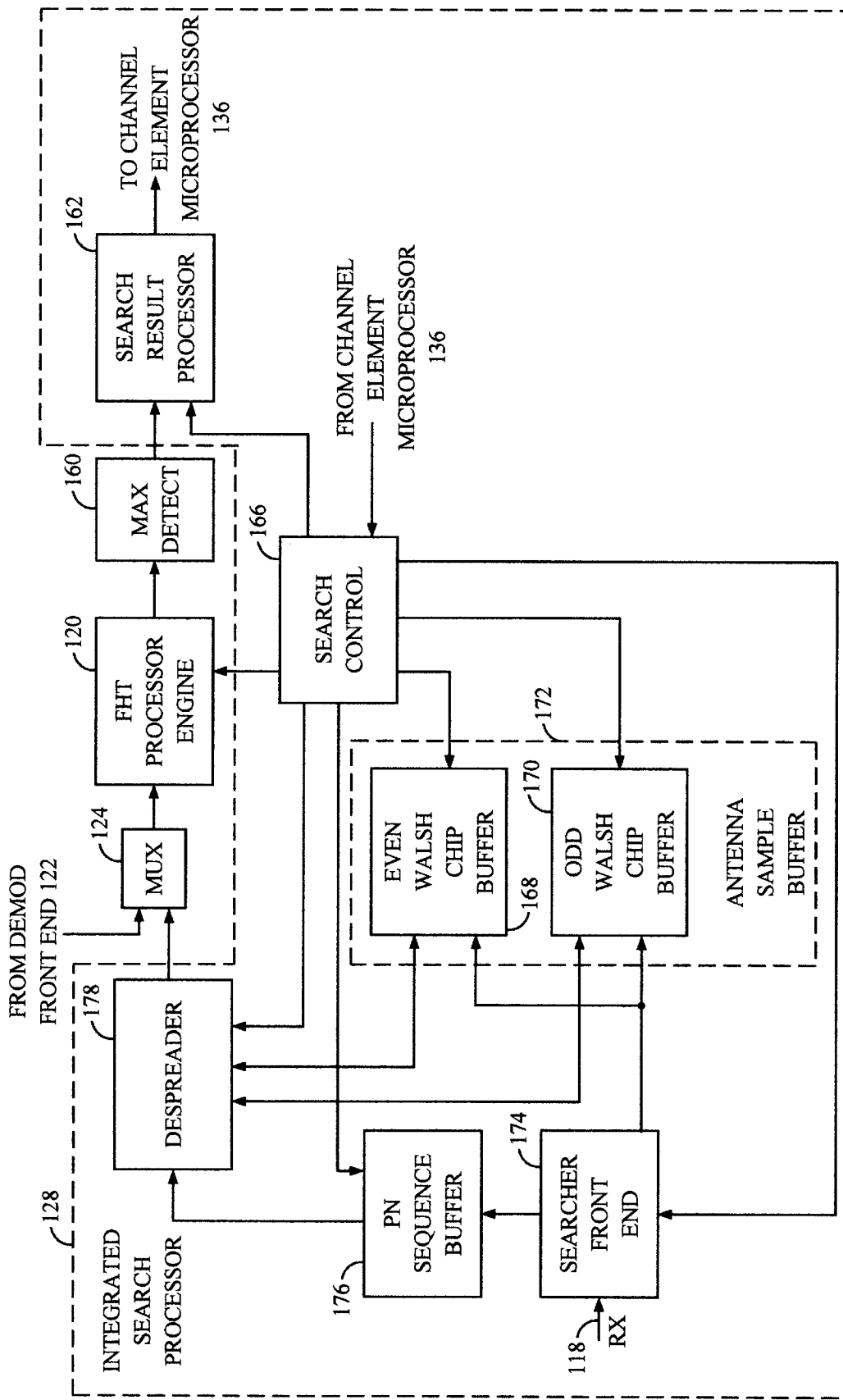
FIG. 5 is a block diagram of the search processor.

FIG. 5 shows the elements comprising integrated search processor 128. The heart of the searching process is time sliced FHT processor engine 120, which, as mentioned above, is shared between integrated search processor 128 and demod front end 122 (not shown in FIG. 5). FHT processor engine 120 can perform Walsh symbol transforms at a rate 32 times faster than FHT processor 52 of FIG. 2. This rapid transform capability empowers the time sliced operation of channel element modem 110.

In the preferred embodiment FHT processor engine 120 is constructed using a six stage butterfly network. As explained in detail above, a Walsh function of order n can be defined recursively as follows:

$$W(n) = \begin{vmatrix} W(n/2), & W(n/2) \\ W(n/2), & W'(n/2) \end{vmatrix}$$

where W' denotes the logical complement of W, and W(1)=0.

In the preferred embodiment a Walsh sequence is generated where n=6, therefore a 6-stage butterfly trellis is used to correlate the 64 Walsh chips of one transmitted Walsh symbol with each of the 64 possible Walsh sequences. A structure and method of operation for FHT processor engine 120 is detailed in a co-pending U.S. patent application Ser. No. 08/173,460 entitled "METHOD AND APPARATUS FOR PERFORMING A FAST HADAMARD TRANSFORM," filed Dec. 22, 1993, assigned to the assignee of the present invention.

To reap the benefits of FHT processor engine 120 with thirty-two times the throughput of its real-time-slaved counterpart, FHT processor engine 120 must be provided with high rate input data to process. Antenna sample buffer 172 has been specifically tailored to meet this need. Antenna sample buffer 172 is written to and read from in a circular manner.

The searching process is grouped in sets of single offset searches. The highest level of grouping is the antenna search set. Each antenna search set is made up of a plurality of search windows. Typically each search window in the antenna search set is an identically performed search group where each search window in the antenna search receives data from a different antenna. Each search window is made up of a series of search rakes. A search rake is a set of sequential search offsets that is performed in a time equivalent to the duration of a Walsh symbol. Each search rake is, comprised of a set of rake elements. Each rake element represents a single search at a given offset.

At the beginning of the searching process, channel element microprocessor 136 sends parameters specifying a search window which may be part of an antenna search set. The width of the search window may be designated in PN chips. The number of search rakes needed to complete the search window varies depending on the number of PN chips specified in the search window. The number of rake elements per search rake can be specified by channel element microprocessor 136 or could be fixed to some constant.

Figure 1:
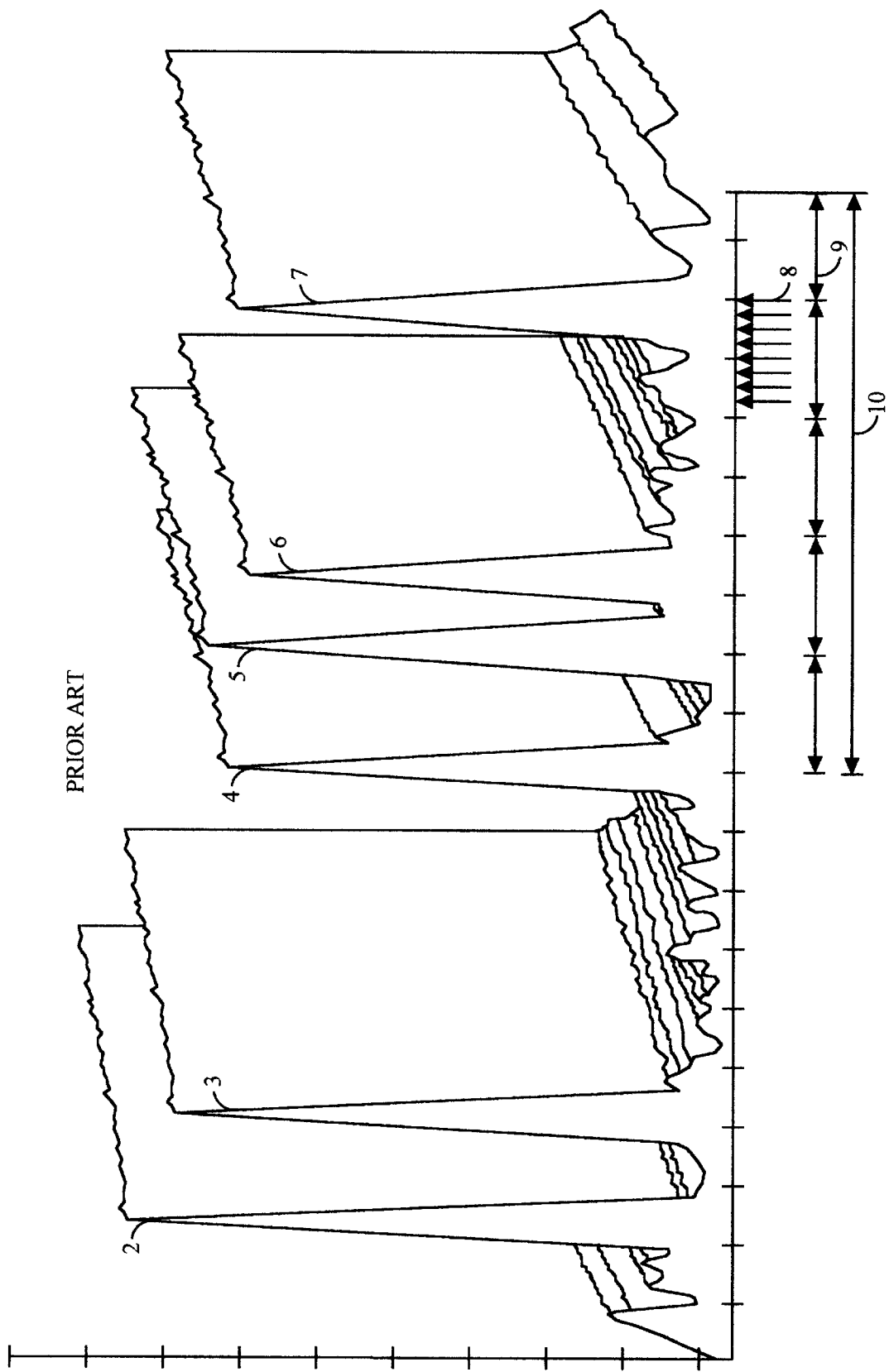
FIG. 1 represents an exemplary severe multipath signal condition.

Referring again to FIG. 1 showing an exemplary set of signals arriving at the base station from a single remote unit, the relationship of the search window, search rake, and rake element becomes more clear. The vertical axis in FIG. 1 represents the power received in decibels (dB). The horizontal axis represents the delay in the arrival time of a signal due to multipath delays. The axis (not shown) going into the page represents a segment of time. Each signal spike in the common plane of the page has arrived at the same time but has been transmitted by the remote unit at a different time.

The horizontal axis can be thought of as having units of PN chip offset. At any given time, the base station perceives a variety of signals from a single remote unit, each of which has traveled a different path and may have a different delay than the others. The remote unit's signal is modulated by a PN sequence. A copy of the PN sequence is also generated at the base station. At the base station, if each multipath signal were individually demodulated, a PN sequence code aligned to each signal's timing would be needed. Each of these aligned PN sequences would be delayed from the zero offset reference at the base station due to the delay. The number of PN chips that the aligned PN sequence is delayed from the zero offset base station reference could be mapped to the horizontal axis.

In FIG. 1, time segment 10 represents a search window set of PN chip offsets to be processed. Time segment 10 is divided into five different search rakes such as search rake time segment 9. Each search rake is in turn made up of a number of rake elements which represent the actual offsets to be searched. For example, in FIG. 1, each search rake is made up of 8 different rake elements such as the rake element indicated by arrow 8.

To process a single rake element as indicated by arrow 8, a set of samples over time at that offset are needed. For example, to process the rake element indicated by arrow 8, the despreading process needs the set of sample at the offset indicated by arrow 8 going back into the page over time. The despreading process also needs a corresponding PN sequence. The PN sequence can be determined by noting the time the samples arrived and the offset desired to be processed. The desired offset can be combined with the arrival time to determine the corresponding PN sequence to be correlated with the received samples.

As the rake element is despread the receive antenna samples and the PN sequence are run through a series of values over time. Note that the received antenna samples are the same for all offsets shown in FIG. 1 and spikes 2–7 are showing exemplary multipath peaks which arrive simultaneously and are only discriminated by the despreading process.

In the preferred embodiment described below, each rake element is offset in time from the preceding rake element by one half PN chip in time. This means that if the rake element corresponding to arrow 8 was correlated beginning from the sliced plane shown and moving forward in time (into the page as shown) then the rake element to the left of the one corresponding to arrow 8 would use samples starting one half chip in time back from the sliced plane shown. This progression in time allows each rake element in a common search rake to be correlated to the same PN sequence.

Each remote unit receives the base station's transmitted signal delayed by some amount due to the path delay through the terrestrial environment. The same I and Q PN short code and the user PN long code generation is also being performed in the remote unit. The remote unit generates a time reference based on the time reference it perceives from the base station. The remote unit uses the time reference signal as an input to its I and Q PN short code and the user PN long code generators. The information signal received at the base station from the remote unit is therefore delayed by the round trip delay of the signal path between the base station and the remote unit. Therefore if the timing of the PN generator used in the searching process is slaved to the zero offset timing reference at the base station, the output of the generators is always available before the corresponding signal is received from the remote unit.

In an OQPSK signal, the I channel data and the Q channel data are offset from each other by one half chip in time. Therefore OQPSK despreading used in the preferred embodiment requires data sampled at twice the chip rate. The searching process also operates optimally with data sampled at half the chip rate. Each rake element within a search rake is offset by one half chip from the previous rake element. The one half chip rake element resolution ensures that multipath peak signals are not skipped over without detection. For these reasons antenna sample buffer 172 of FIG. 5 stores data sampled at twice the PN chip rate.

One Walsh symbol worth of data is read from antenna sample buffer 172 to process a single rake element. For each successive rake element, one Walsh symbol worth of data is read out of antenna sample buffer 172 one half of a PN chip offset from the previous rake element. Each rake element is despread with the same PN sequence read from PN sequence buffer 176 by despreader 178 for each rake element in the search rake.

Antenna sample buffer 172 is two Walsh symbols deep and is continually and repeatedly read from and written to throughout the searching process. Within each search rake, the rake element having the latest offset in time is processed first. The latest offset corresponds to the signal which has traveled the longest signal path from the remote unit to the base station. The time at which the searcher starts to process a search rake is keyed to the Walsh symbol boundaries associated with the rake element having the latest offset in the search rake. A time strobe, referred to as the offset Walsh symbol boundary, indicates the earliest time that all of the samples needed are available in antenna sample buffer 172 and the searching process can begin the first rake element in the search rake.

Figure 6:
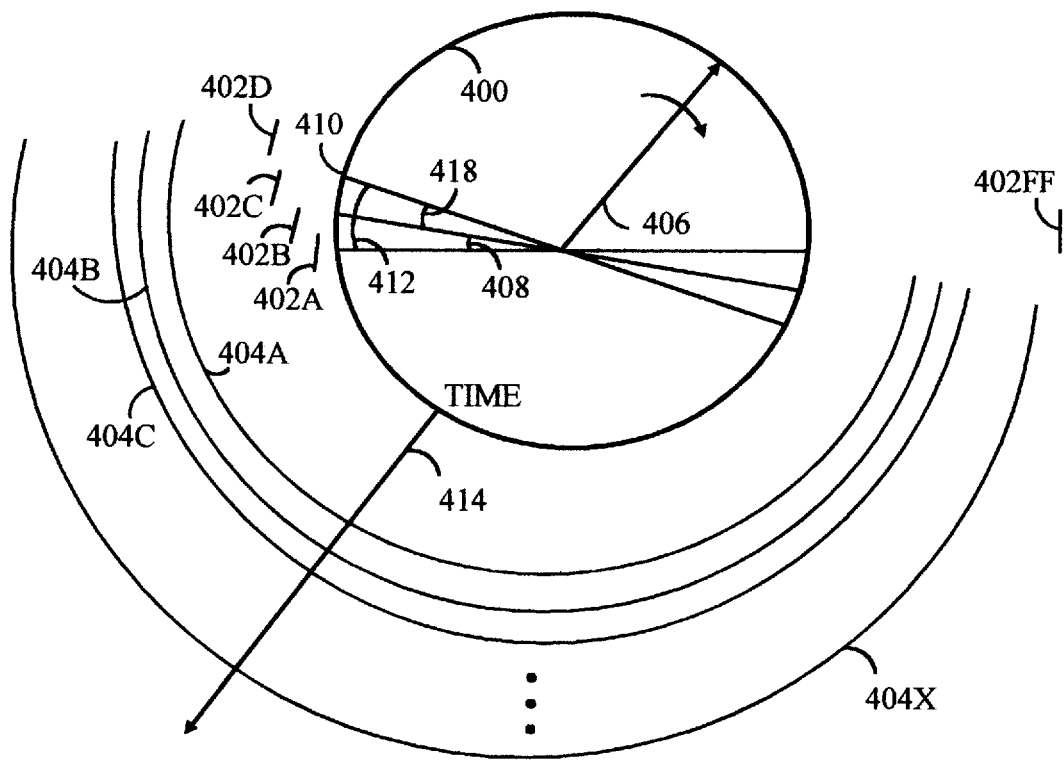
FIG. 6 illustrates the circular nature of the antenna sample buffer using a first offset.

The operation of antenna sample buffer 172 is most easily illustrated by noting its circular nature. FIG. 6 shows an illustrative diagram of the operation of antenna sample buffer 172. In FIG. 6 thick circle 400 can be thought of as antenna sample buffer 172 itself. Antenna sample buffer 172 contains memory locations for two Walsh symbols worth of data. Write pointer 406 circulates around antenna sample buffer 172 in the direction indicated in real time, meaning that write pointer 406 rotates around the two Walsh symbol deep antenna sample buffer 172 in the time that two Walsh symbols worth of samples are passed to searcher front end 174. As the samples are written into antenna sample buffer 172 according to the memory location indicated by write pointer 406, the previously stored values are overwritten. In the preferred embodiment, antenna sample buffer 172 contains 1024 antenna samples because each of the two Walsh symbols contains 64 Walsh chips, each Walsh chip contains 4 PN chips, and each PN chip is sampled twice.

The operation of the searching process is divided into discrete 'time slices.' In the preferred embodiment, a time slice is equal to $\frac{1}{32}$ of the Walsh symbol duration. The choice of 32 time slices per Walsh symbol is derived from the available clocking frequency and number of clock cycles need to perform an FHT. 64 clock cycles are required to perform an FHT for one Walsh symbol. In the preferred embodiment, a clock running at eight times the PN chip frequency is available and provides the necessary performance level. Eight times the PN chip rate multiplied by the 64 required clocks is equivalent to the time it takes to receive two Walsh chips worth of data. Because there are 64 Walsh chips in each half of the buffer, 32 time slices are needed to read in a complete Walsh symbol.

In FIG. 6, a set of concentric arcs outside of thick circle 400 represents read and write operation with antenna sample buffer 172. (The arcs within thick circle 400 are used to aid explanation and do not correspond to read or write operations.) Each arc represents a read or write operation during one time slice. The arc closest to the center of the circle occurs first in time and each successive arc represents an operation occurring in successively later time slices as indicated by time arrow 414. Each of the concentric arcs corresponds to a section of antenna sample buffer 172 as represented by thick circle 400. If one were to imagine radii drawn from the center of thick circle 400 to the end points of each of the concentric arcs, the portion of thick circle 400 between the intersection of the radii and thick circle 400 would be representative of the memory locations accessed. For example, during the first time slice operation shown, 16 antenna samples are written to antenna sample buffer 172 represented by arc 402A.

Figure 7:
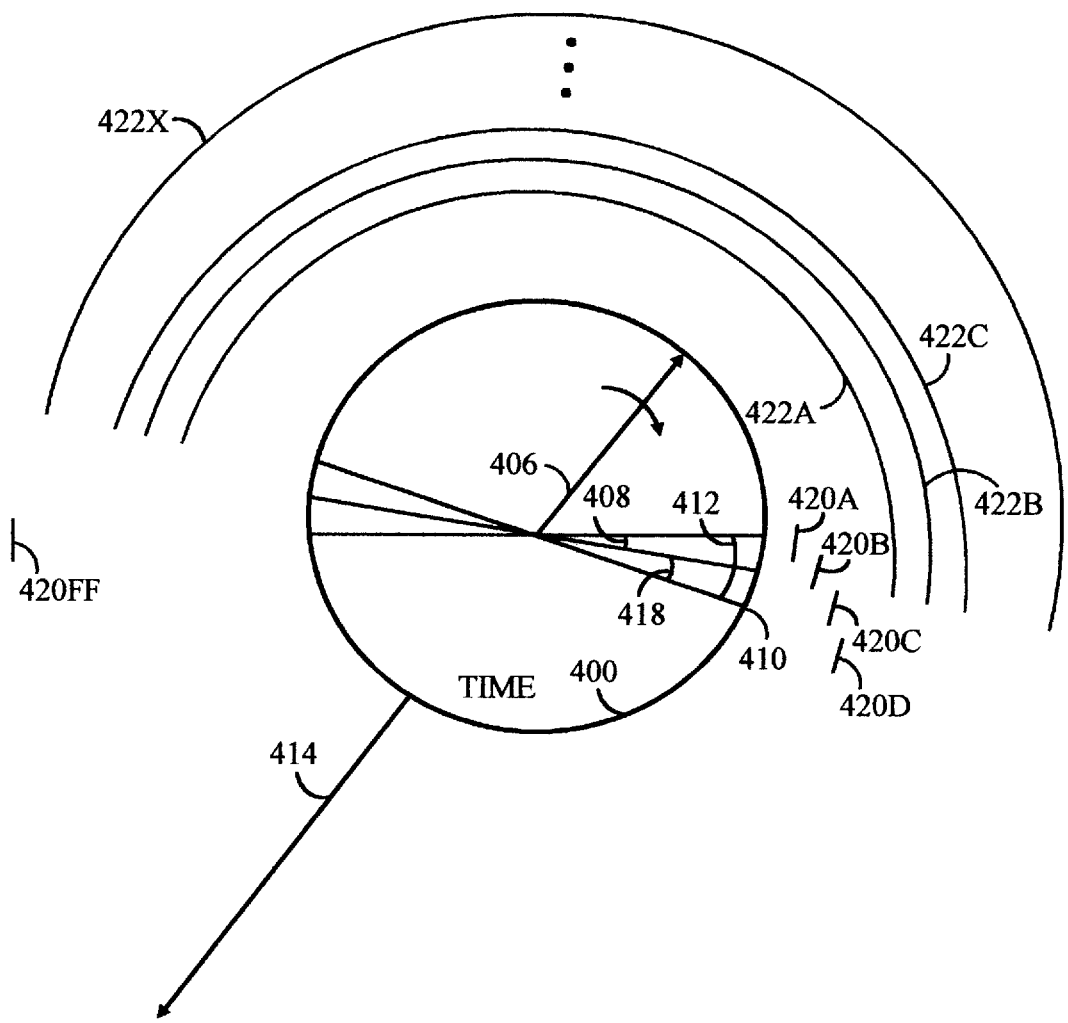
FIG. 7 illustrates the circular nature of the antenna sample buffer for a second accumulation at the first offset of FIG. 6.
Figure 8:
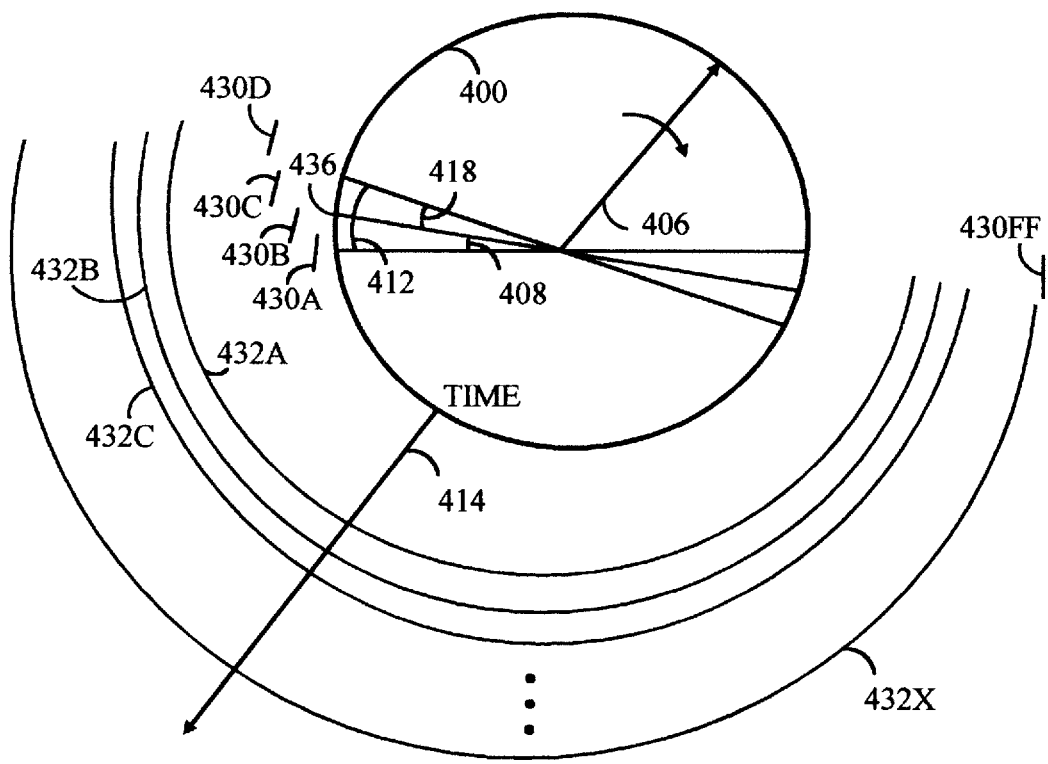
FIG. 8 illustrates the circular nature of the antenna sample buffer for a second offset.

In FIGS. 6, 7, and 8 the following search parameters for the illustrative search window are assumed:

Search window width=24 PN chips

Search offset=24 PN chips

Number of symbols to accumulate=2

Number of rake elements per search rake=24.

FIG. 6 also assumes that antenna sample buffer 172 contains nearly a full Walsh symbol worth of valid data before the write indicated by arc 402A. During subsequent time slices, a write corresponding to arc 402B and to arc 402C occurs. During the 32 time slices available during one Walsh symbol worth of time, the write operations continue from arc 402A to arc 402FF most of which are not shown.

The 32 time slices represented by arcs 402A to 402FF correspond to the time used to complete one search rake. Using the parameters given above, the search rake begins 24 PN chips offset from zero offset reference or 'real time' and contains 24 rake elements. The 24 PN chip offset corresponds to a rotation 16.875 degrees around thick circle 400 from the beginning of the first write indicated by arc 402A (calculated by dividing the 24 PN chip offset by the 256 total number of chips in half antenna sample buffer 172 and multiplying by 180 degrees.) The 16.875 degree arc is illustrated by arc 412. The 24 rake elements correspond to reads indicated by arcs 404A–404X most of which are not shown. The first read corresponding to arc 404A begins at the search offset some time after the write corresponding to 402C so that a contiguous set of data is available. Each successive read such as 404B is offset from the previous by a single memory location, corresponding to a ½ PN chip of time. During the search rake shown, the reads move toward earlier time offsets as shown by arcs 404A–404X slanting counter clockwise with progressing time in the opposite rotation direction as write pointer indication 406. The 24 read represented by arcs 404A to 404X traverse the arc indicated by arc 418. The progression of the reads toward earlier samples has the advantage of providing seamless searching within a search window as each search rake is executed. This advantage is explained in detail subsequently herein.

Each of the reads corresponding to arcs 404A to 404X passes one Walsh symbol worth of data to despreader 178. The read therefore corresponds to traversing thick circle 400 by 180 degrees. Note that in the search rake shown in FIG. 6, the last write corresponding to arc 402FF, and last read corresponding to arc 404X do not include any common memory locations to ensure contiguous valid data. However, hypothetically, if the pattern of read and writes were to continue they would in fact intersect and valid data would not be provided under this condition.

In most signaling conditions, the result of a rake element worth of data collected during one Walsh symbol worth of time is not sufficient to provide accurate information about the location of diverse signals. In these cases, a search rake may be repeated multiple times. The results of rake elements in successive search rakes at a common offset are accumulated by search result processor 162 as explained in detail subsequently herein. In this case the search parameters given above indicate that the number of symbols to accumulate at each offset is two. FIG. 7 shows the search rake of FIG. 6 repeated at the same offset for the next successive Walsh symbol worth of data. Note that antenna sample buffer 172 contains two Walsh symbols worth of data so that the data that is needed for processing during the search rake indicated on FIG. 7 was written during the search rake shown on FIG. 6. In this configuration, memory locations 180 degrees away from each other represent the same PN offset.

After completing the two accumulated search rakes in FIGS. 6 and 7, the searching process advances to the next offset in the search window. The amount of the advance is equal to the width of the search rake processed, in this case 12 PN chips. As specified in the search parameters, the search window width is 24 PN chips. The width of the window will determine how many search rake offsets are needed to complete the search window. In this case two different offsets are needed to cover the 24 PN chip window width. The window width is indicated on FIG. 8 by arc 412. The second offset for this search window begins at the offset following the last offset of the previous search rake and continues around to the nominal zero offset point as set by the location of the beginning of the first write as indicated by arc 430A. Again there are 24 rake elements within the search rake as indicated by arcs 432A–432X most of which are not shown. Again the 32 writes are indicated by the arcs 430A–430FF. Thus the last write, as indicated by arc 430FF, and the last read, as indicated by arc 432X, abut one another in antenna sample buffer 172.

The search rake shown in FIG. 8 is repeated on the opposite side of antenna sample buffer 172 much as the search rake in FIG. 6 is repeated in FIG. 7 because the search parameters designate that each symbol is accumulated twice. At the completion of the second accumulation of the second search rake, integrated search processor 128 is available to begin another search window. The subsequent search window could have a new offset or it could specify a new antenna or both.

In FIG. 8, the location of the boundary between the read half and the write half of the buffer is marked with label 436. In FIG. 6, the boundary is marked with label 410. The signal which indicates the point in time corresponding to labels 410 and 436 is referred to as the offset Walsh symbol strobe and also indicates that a new Walsh symbol worth of samples is available. As the search rakes within a window advance to earlier offsets, the boundary between the read and write halves of the buffer slews in lock step counterclockwise as shown in FIG. 8. If after the completion of the present search window, if a large change in the offset being processed is desired, the offset Walsh symbol strobe may be advanced a large portion of the circumference of the circle.

Figure 9:
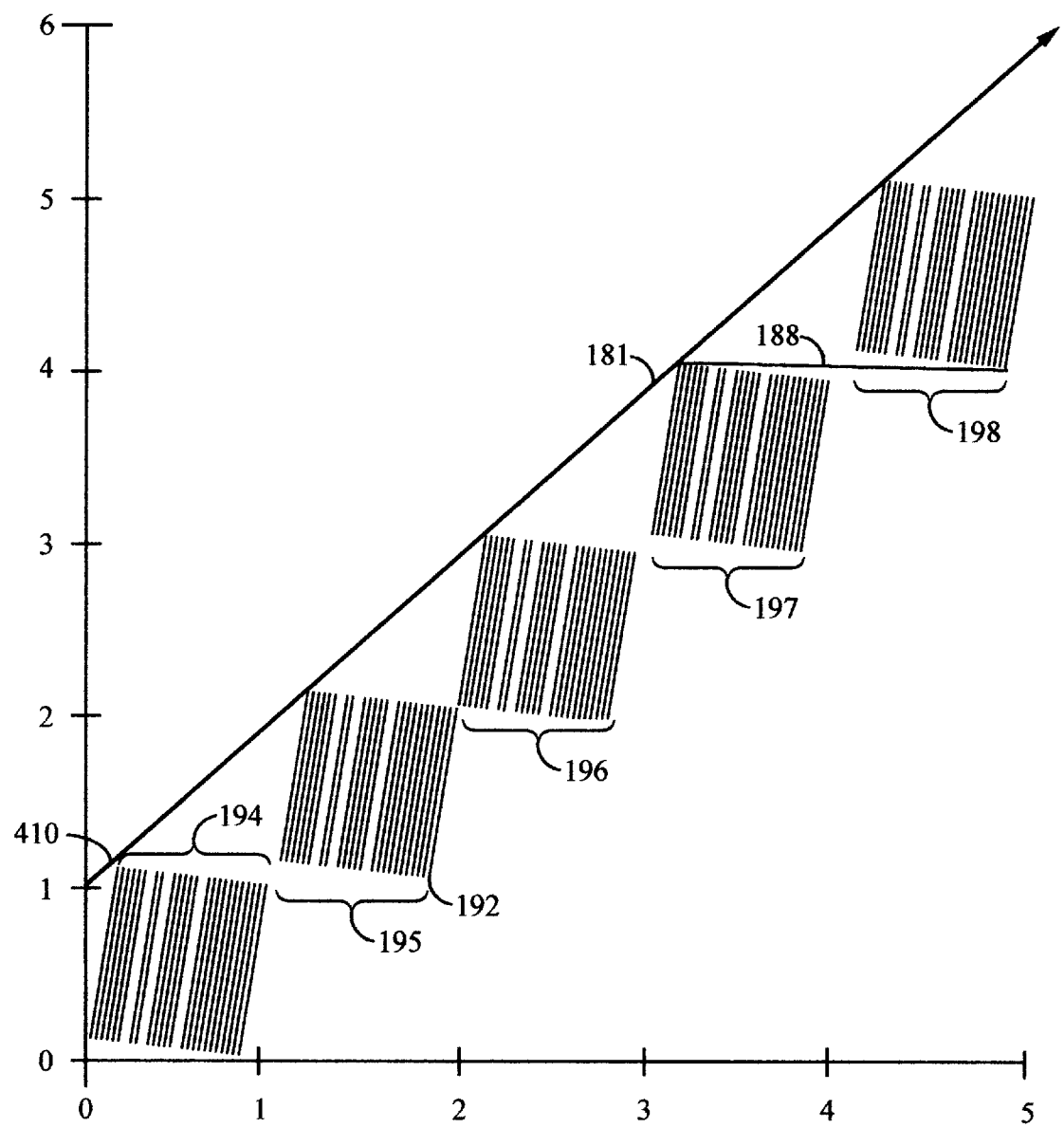
FIG. 9 is a graph showing how the searcher processes the receiver input as a function of time.

FIG. 9 is a search timeline that provides further graphical illustration of the searcher processing. Time is plotted along the horizontal axis in units of Walsh symbols. Antenna sample buffer 172 addresses and PN sequence buffer 176 addresses are shown along the vertical axis, also in units of Walsh symbols. Because antenna sample buffer 172 is two Walsh symbols deep, antenna sample buffer 172 addressing wraps on even Walsh symbol boundaries, but for illustrative purposes, FIG. 9 shows the addresses before being folded on top of one another. Samples are written into antenna sample buffer 172 at an address taken directly from the time they were obtained, so write pointer 181 into antenna sample buffer 172 is a straight forty-five degree inclined line. The offset being processed maps into a base address in antenna sample buffer 174 to start a read of a Walsh symbol of samples for a single rake element. The rake elements are illustrated in FIG. 9 as nearly vertical read pointer line segments 192. Each rake element maps to a Walsh symbol in height as referred to the vertical axis and ⅟₃₂ of a Walsh symbol as referred to the horizontal axis.

The vertical gaps between the rake elements within a search rake are caused by demod front end 122 interrupting the search process to use FHT processor engine 120. Demod front end 122 operates in real time and has first priority use of FHT processor engine 120 whenever it has a current or queued set of data for processing. Therefore typically use of FHT processor engine 120 is given to demod front end 120 on each Walsh symbol boundary corresponding to a PN offset that is being demodulated by demod front end 122.

FIG. 9 shows the same search rakes shown in FIGS. 6, 7, and 8. For example, search rake 194 has 24 rake elements each of which corresponds to one to the read arcs 404A–404X on FIG. 6. On FIG. 9 for search rake 194, pointer 410 indicates the offset Walsh symbol strobe corresponds to the like pointer on FIG. 6. To read the current samples, each rake element must be beneath write pointer 181. The downward slope of the rake elements with a search rake indicates the steps towards earlier samples. Search rake 195 corresponds to the search rake shown in FIG. 7 and search rake 196 corresponds to the search rake shown in FIG. 8.

In the search window defined by the parameters above, only 24 rake elements per search rake are specified even though the search rake has 32 available time slices. Each rake element can be processed in one time slice. However, it is not practically possible to increase the number of rake elements per search rake to 32 to match the number of time slices available during a search rake. Demod front end 122 uses some of the available time slices of the FHT processor. There is also a time delay associated with a rake advance as the read process must wait for the write process to fill the buffer with valid data at the advanced offset. Also some margin is needed to synchronize to a time slice processing boundary after observing the offset Walsh symbol strobe. All these factors practically limit the number of rake elements which can be processed in a single search rake. In some cases the number of rake elements per search rake could be increased such as if demod front end 122 has only one demodulation element assigned and hence only interrupts FHT processor engine 120 once per search rake. Therefore in the preferred embodiment, the number of rake elements per search rake is controllable by channel element microprocessor 136. In alternative embodiments, the number of rake elements per search rake could be a fixed constant.

There also can be significant overhead delay when switching between source antennas at the input to the sample buffer or changing the search window starting point or width between searches. If one rake needs a particular set of samples and the next rake for a different antenna needs to use an overlapping part of the buffer, the next rake must postpone processing until the next offset Walsh symbol boundary occurs, at which point a complete Walsh symbol of samples for the new antenna source is available. In FIG. 9, search rake 198 is processing data from a different antenna than search rake 197. Horizontal line 188 indicates the memory location corresponding to the new antenna input samples. Note that search rake 197 and 198 do not use any common memory locations.

For every time slice, two Walsh chips of samples must be written to the sample buffer and one full Walsh symbol of samples may be read from the sample buffer. In the preferred embodiment, there are 64 clock cycles during each time slice. A full Walsh chip of samples is comprised of four sets of samples: ontime I channel samples, late I channel samples, ontime Q channel samples and late Q channel samples. In the preferred embodiment, each sample is four bits. Therefore sixty four bits per clock are needed from antenna sample buffer 172. Using a single port RAM, the most straightforward buffer design doubles the word width to 128 bits, and splits the buffer into two 64 bit wide, 64 word, independently read/writeable even and odd Walsh chip buffers 168, 170. The much less frequent writes to the buffer are then multiplexed in between reads, which toggle between the two banks on successive clock cycles.

The Walsh chip samples read from the even and odd Walsh chip buffers 168,170 has an arbitrary alignment to the physical RAM word alignment. Therefore on the first read of a time slice, both halves are read into despreader 178 to form a two Walsh chip wide window from which the single Walsh chip with the current offset alignment is obtained. For even Walsh chip search offsets, the even and odd Walsh chip buffer address for the first read are the same. For odd Walsh chip offsets, the even address for the first read is advanced by one from the odd address to provide a consecutive Walsh chip starting from the odd half of the sample buffer. The additional Walsh chips needed by despreader 178 can be passed thereto by a read from a single Walsh chip buffer. Successive reads then ensure that there is always a refreshed two Walsh chip wide window from which to draw a Walsh chip of data aligned to the current offset being processed.

Referring again to FIG. 5, for each rake element in a search rake, the same Walsh symbol of PN sequence data from PN sequence buffer 176 is used in the despreading process. For every clock cycle of a time slice, four pairs of PN-I' and PN-Q' are needed. Using a single port RAM, the word width is doubled and read from half as often. The single write to PN sequence buffer 176 needed per time slice is then performed on a cycle not used for reading.

Because the searching process can specify searching PN offsets of up to two Walsh symbols delayed from the current time, four Walsh symbols worth of PN sequence data must be stored. In the preferred embodiment PN sequence buffer 176 is a one hundred and twenty eight word by sixteen bit RAM. Four Walsh symbols are required because the starting offset can vary by 2 Walsh symbols and once the starting offset is chosen, one Walsh symbol worth of PN sequence is need for correlation meaning three Walsh symbols worth of data is need for the despreading process. Because the same PN sequence is repeatedly used, the data in PN sequence buffer 176 cannot be overwritten during the despreading process corresponding to a single search rake. Therefore an additional Walsh symbol worth of memory is needed to store the PN sequence data as it is generated.

Figure 10:
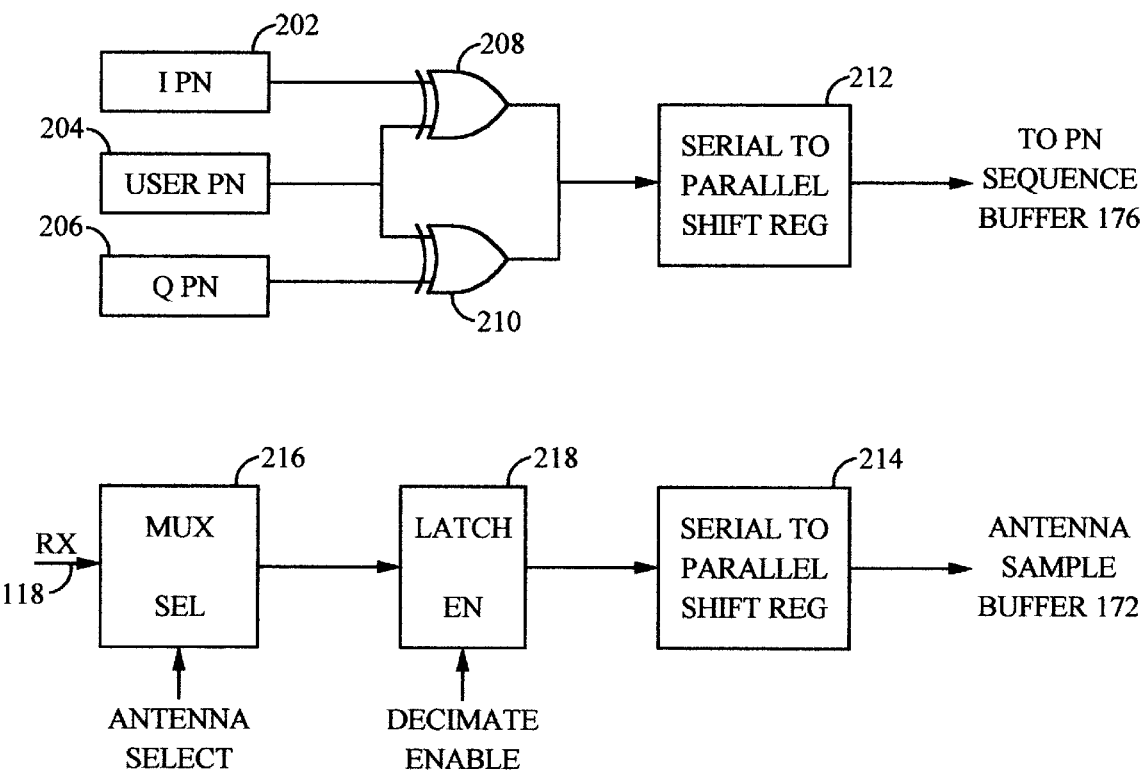
FIG. 10 is a block diagram of the searcher front end.

The data that is written into both PN sequence buffer 176 and antenna sample buffer 172 is provided by searcher front end 174. A block diagram of searcher front end 174 is shown in FIG. 10. Searcher front end 174 includes short code I and Q PN generators 202, 206 and the long code User PN generator 204. The values output by short code I and Q PN generators 202,206 and the long code User PN generator 204 are determined in part by the time of day. Each base station has a universal timing standard such as GPS timing to create a timing signal. Each base station also transmits its timing signal over the air to the remote units. At the base station, the timing reference is said to have zero offset because it is aligned to the universal reference.

The output of long code User PN generator 204 is logically XOR'd with the output of short code I and Q PN generators 202, 206 by XOR gates 208 and 210 respectively. (This same process is also performed in the remote unit and the output is used to modulate the remote unit's transmitted signal.) The output of XOR gates 208 and 210 is stored in serial to parallel shift register 212. Serial to parallel shift register 212 buffers the sequences up to the width of PN sequence buffer 176. The output of serial to parallel shift register 212 is then written into PN sequence buffer 176 at an address taken from the zero offset reference time. In this way, searcher front end 174 provides the PN sequence data to PN sequence buffer 176.

Searcher front end 174 also provides antenna samples to antenna sample buffer 172. Receive samples 118 are selected from one of a plurality of antennas via a MUX 216. The selected receive samples from MUX 216 are passed to latch 218 where they are decimated, meaning one quarter of the samples are selected for use in the searching process. Receive samples 118 have been sampled at eight times the PN chip rate by analog transmitter receiver 116 (of FIG. 4). Processing within the searching algorithm is designed for samples taken at one half the chip rate. Therefore only one quarter of the received samples need be passed to antenna sample buffer 172.

The output of the latch 218 is fed to serial to parallel shift register 214, which buffers the samples up to the width of antenna sample buffer 172. The samples are then written into even and odd Walsh chip buffers 168, 170 at addresses also taken from the zero offset reference time. In this way, despreader 178 can align the antenna sample data with a known offset with respect to the PN sequence.

Referring again to FIG. 5, for each clock cycle in a time slice, despreader 178 takes a Walsh chip of antenna samples from antenna sample buffer 172 and a corresponding set of PN sequence values from PN sequence buffer 176 and outputs an I and Q channel Walsh chip to FHT processor engine 120 through MUX 124.

Figure 11:
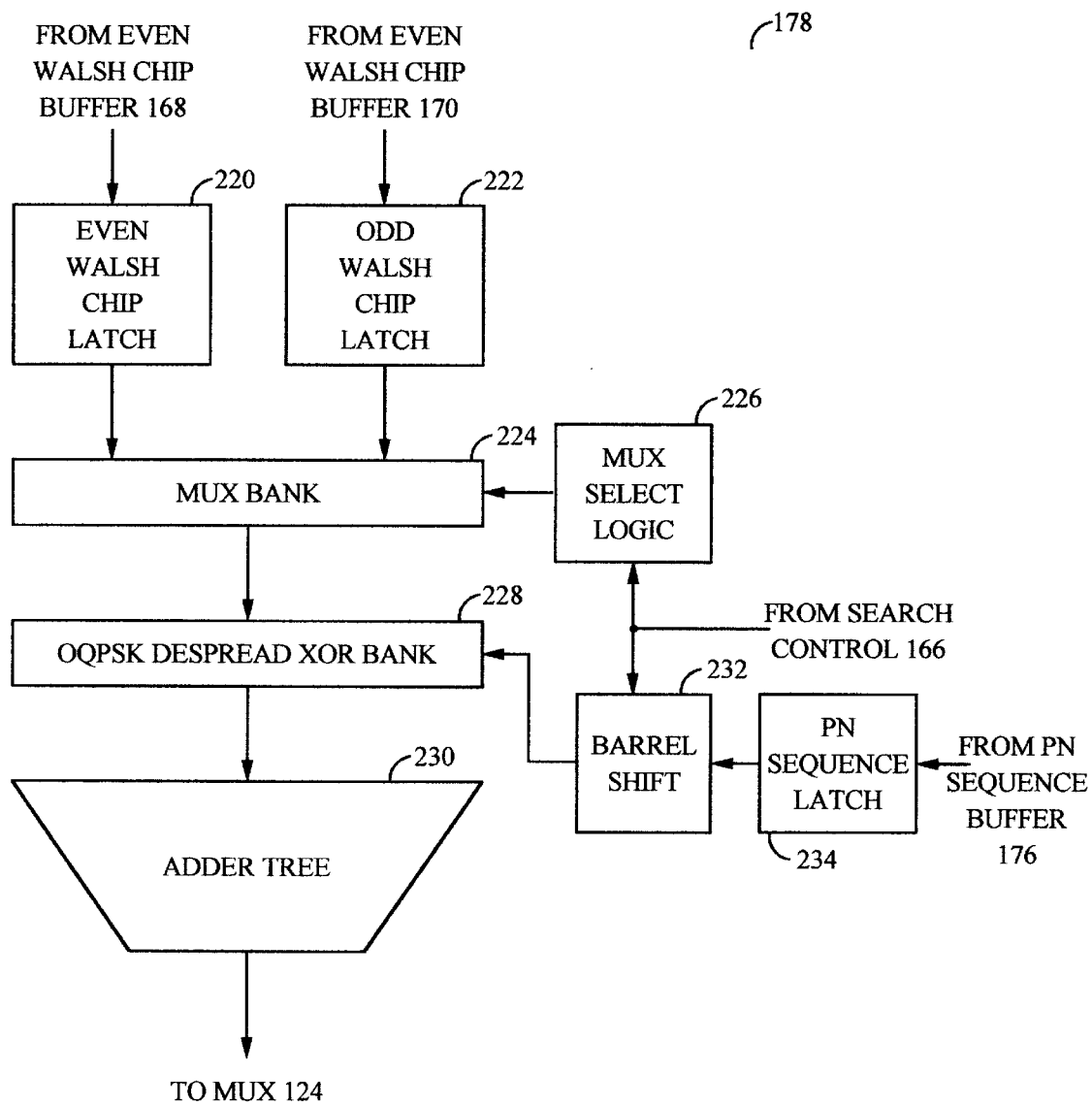
FIG. 11 is a block diagram of the searcher despreader.

FIG. 11 shows a detailed block diagram of despreader 178. Even Walsh chip latch 220 and odd Walsh chip latch 222 latch the data from even Walsh chip buffer 168 and odd Walsh chip buffer 170 respectively. MUX bank 224 extracts the Walsh chip of samples to be used from the two Walsh chips worth of samples presented by even and odd Walsh chip latches 220 and 222. MUX select logic 226 defines the boundary of the selected Walsh chip based on the offset of the rake element being processed. A Walsh chip is output to OQPSK despreader XOR bank 228.

The PN sequence values from PN sequence buffer 176 are latched by PN sequence latch 234. Barrel shifter 232 rotates the output of PN sequence latch 234 based on the offset of the rake element being processed and passes the PN sequence to OQPSK despreader XOR bank 228 which conditionally inverts the antenna samples based on the PN sequence. The XOR'd values are then summed through adder tree 230 which performs the sum operation in the OQPSK despread, and then sums four despread chip outputs together to form a Walsh chip for input to FHT processor engine 120.

Referring again to FIG. 5, FHT processor engine 120 takes sixty-four received Walsh chips from despreader 178 through MUX 124, and using a 6-stage butterfly trellis, correlates these sixty-four input samples with each of the sixty-four Walsh functions in a sixty-four clock cycle time slice. Max detect 160 can be used to find the largest of the correlation energies output from FHT processor engine 120. The output of MAX detect 160 is passed on to search result processor 162 which is part of integrated search processor 128.

Figure 12:
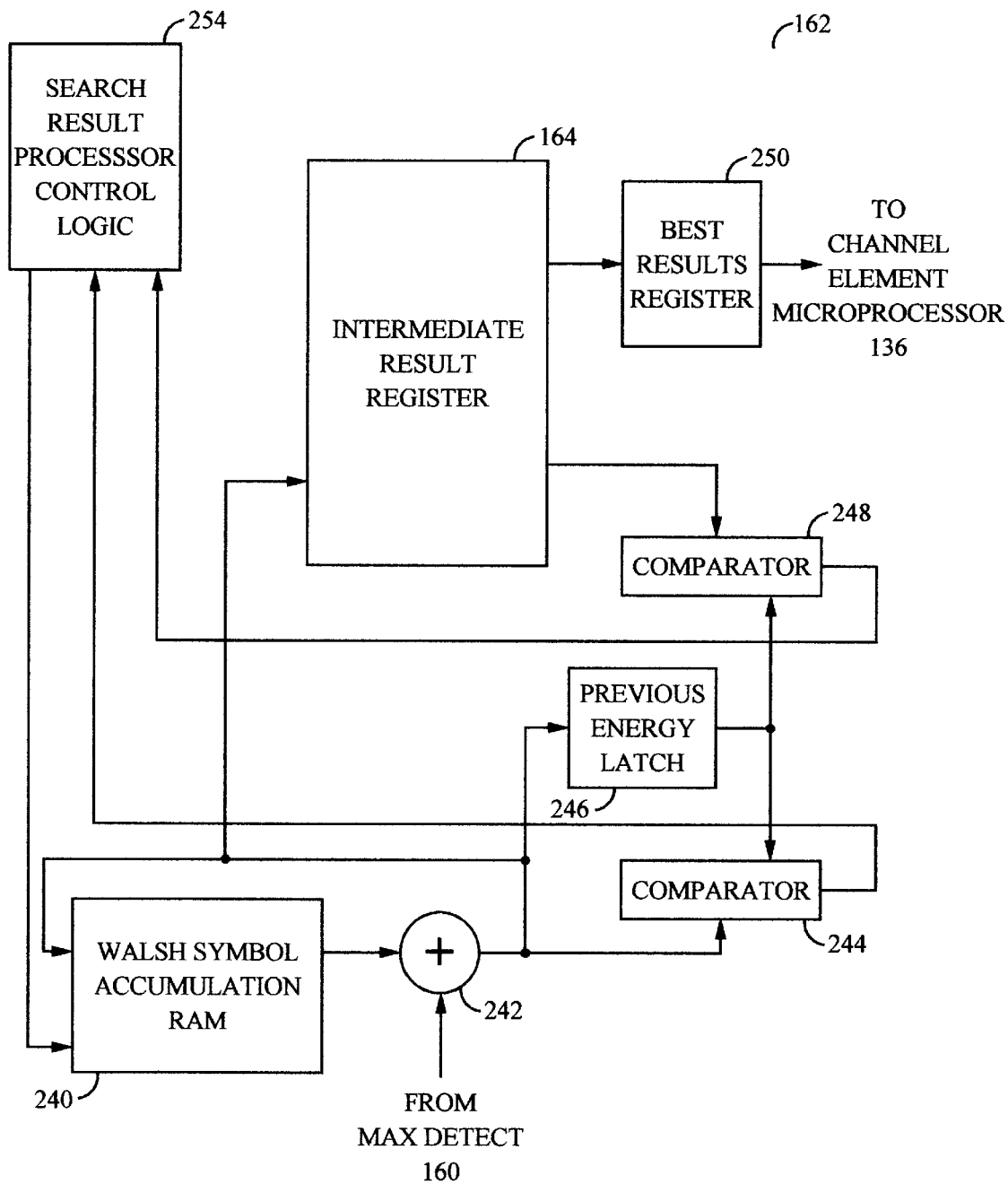
FIG. 12 is a block diagram of the searcher result processor.

Search result processor 162 is detailed in FIG. 12. Search result processor 162 also operates in a time sliced manner. The control signals provided to it are pipeline delayed to match the two time slice delay from the start of inputting Walsh chips to FHT processor engine 120 to obtaining the maximum energy output. As explained above, a set of search window parameters may designate that a number of Walsh symbols worth of data be accumulated before the results of the chosen offset are processed. In the parameters used with the example of FIGS. 6, 7, 8, and 9, the number of symbols to accumulate is 2. Search result processor 162 performs the summing function along with other functions.

As search result processor 162 performs the sums over consecutive Walsh symbols, it must store a cumulative sum for each rake element in the search rake. These cumulative sums are stored in Walsh symbol accumulation RAM 240. The results of each search rake are input to summer 242 from max detect 160 for each rake element. Summer 242 sums the present result with the corresponding intermediate value available from Walsh symbol accumulation RAM 240. On the final Walsh symbol accumulation for each rake element, the intermediate result is read from Walsh symbol accumulation RAM 240 and summed by summer 242 with the final energy from that rake element to produce a final search result for that rake element offset. The search results are then compared with the best results found in the search up to this point as explained below.

In the above mentioned co-pending U.S. patent application Ser. No. 08/144,902 entitled "DEMODULATION ELEMENT ASSIGNMENT IN A SYSTEM CAPABLE OF RECEIVING MULTIPLE SIGNALS," the preferred embodiment assigns the demodulation elements based on the best results from a search. In the present preferred embodiment, the eight best results are stored in best result register 250. (A lesser or greater number of results could be stored in other embodiments.) Intermediate result register 164 stores the peak values and their corresponding rank order. If the current search result energy exceeds at least one of the energy values in intermediate result register 164, search result processor control logic 254 discards the eighth best result in intermediate result register 164, and inserts the new result, along with its appropriate rank, the PN offset, and antenna corresponding to the rake element result. All lesser ranked results are "demoted" one ranking. There are a great number of methods well known in the art for providing such a sorting function. Any one of them could be used within the scope of this invention.

Search result processor 162 has a local peak filter basically comprised of comparator 244 and previous energy latch 246. The local peak filter, if enabled, prevents intermediate result register 164 from being updated even though a search result energy would otherwise qualify for inclusion, unless the search result represents a local multipath peak. In this way, the local peak filter prevents strong, broad "smeared" multipath from filling multiple entries in intermediate result register 164, leaving no room for weaker but distinct multipath that may make better candidates for demodulation.

The implementation of the local peak filter is straightforward. The energy value of the previous rake element summation is stored in previous energy latch 246. The present rake element summation is compared to the stored value by comparator 244. The output of comparator 244 indicates which of its two inputs is larger and is latched in search result processor control logic 254. If the previous sample represented a local maxima, search result processor control logic 254 compares the previous energy result with the data stored in intermediate result register 164 as described above. If the local peak filter is disabled by channel element microprocessor 136 then the comparison with intermediate result register 164 is always enabled. If either the leading or the last rake element at the search window boundary has a slope, then the slope latch is set so the boundary edge value can be considered as a peak as well.

The simple implementation of this local peak filter is aided by the progression of the reads toward earlier symbols within a search rake. As illustrated in FIGS. 6, 7, 8, and 9, within a search rake each rake element progress toward signals arriving earlier in time. This progression means that within a search window, the last rake element of a search rake and the first rake element of the subsequent search rake are contiguous in offset. Therefore, the local peak filter operation does not have to change and the output of comparator 244 is valid across search rake boundaries.

At the end of processing a search window, the values stored in intermediate result register 164 are transferred to best result register 250 readable by channel element microprocessor 136. Search result processor 162 has thus taken much of the workload from channel element microprocessor 136, which in the system of FIG. 2 needed to handle each rake element result independently.

The preceding sections have focused on the processing data path of integrated search processor 128 and have detailed how raw antenna samples 118 are translated into a summary multipath report at the output of best result register 250. The following sections detail how the each of the elements in the search processing data path are controlled.

Figure 13:
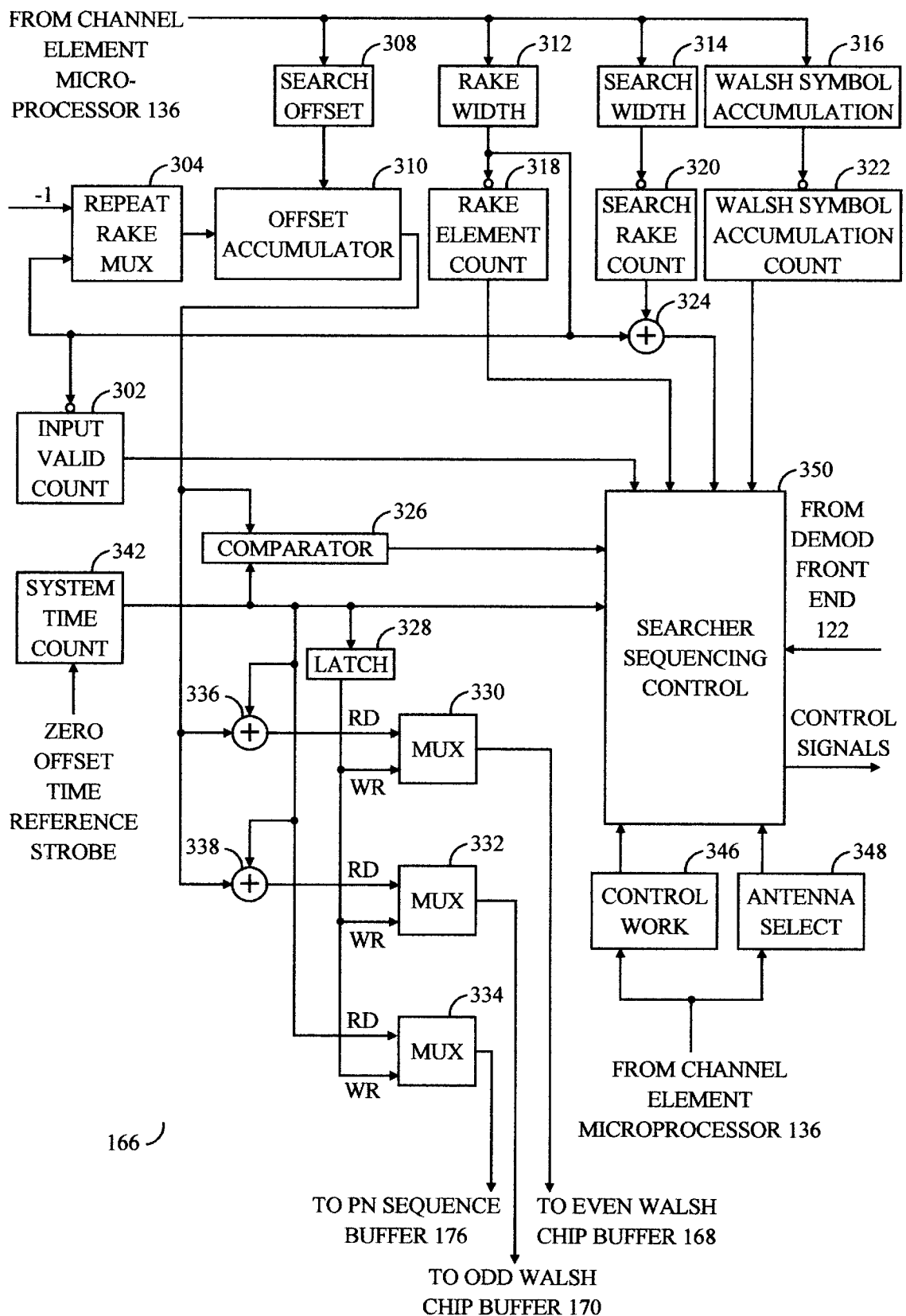
FIG. 13 is a block diagram of the searcher sequencing control logic.

Search control block 166 of FIG. 5 is detailed in FIG. 13. As mentioned previously, channel element microprocessor 136 specifies a search parameter set including the group of antennas to search over as stored in antenna select buffer 348, the starting offset as stored in search offset buffer 308, the number of rake elements per search rake as stored in rake width buffer 312, the width of the search window as stored in search width buffer 314, the number of Walsh symbols to accumulate as stored in Walsh symbol accumulation buffer 316, and a control word as stored in control word buffer 346.

The starting offset stored in search offset buffer 308 is specified with eighth chip resolution. The starting offset controls which samples are removed by decimation by latch 218 of FIG. 10 in searcher front end 174. Due to the two Walsh symbol wide antenna sample buffer 172 in this embodiment, the largest value of the starting offset is half of a PN chip less than two full Walsh symbols.

Up until this point, the generic configuration to perform a search has been disclosed. In reality there are several classes of predefined searches. When a remote unit initially attempts to access the system, it sends a beacon signal called a preamble using the Walsh zero symbol. Walsh zero symbol is the Walsh symbol which contains all logical zeros instead of half ones and zeroes as described above. When a preamble search is performed, the searcher looks for any remote unit sending a Walsh zero symbol beacon signal on an access channel. The search result for a preamble search is the energy for the Walsh zero symbol. When an acquisition mode access channel search is performed, max detect 160 outputs the energy for Walsh zero symbol regardless of the maximum output energy detected. The control word stored in control word buffer 346 includes a preamble bit which indicates when a preamble search is being performed.

As discussed above, the power control mechanism of the preferred embodiment measures the signal level received from each remote unit and creates a power control indication to command the remote unit to raise or lower the remote unit's transmit power. The power control mechanism operates over a set of Walsh symbols called a power control group during traffic channel operation. (Traffic channel operation follows access channel operation and implies operation during an active call.) All the Walsh symbols within a single power control group are transmitted using the same power control indication command at the remote unit.

Also as described above, in the preferred embodiment of the present invention, the signal transmitted by the remote unit is of a variable rate during traffic channel operation. The rate used by the remote unit to transmit the data is unknown at the base station during the searching process. As the consecutive symbols are accumulated, it is imperative that the transmitter is not gated off during the accumulation. Consecutive Walsh symbols in a power control group are gated as a group meaning that the 6 Walsh symbols comprising a power control group in the preferred embodiment are all gated on or all gated off.

Thus when the search parameter specifies that a plurality of Walsh symbols be accumulated during traffic channel operation, the searching process must align each search rake to begin and end within a single power control group. The control word stored in control word buffer 346 includes a power control group alignment bit. With the power control group alignment bit set to one indicating a traffic channel search, the searching process synchronizes to the next power control group boundary instead of just the next offset Walsh symbol boundary.

The control word stored in control word buffer 346 also includes the peak detection filter enable bit as discussed earlier in conjunction with FIG. 8.

The searcher operates either in continuous or single step mode, according to the setting of the continuous/single step bit of the control word. In single step mode, after a search is performed, integrated search processor 128 returns to an idle state to await further instructions. In continuous mode, integrated search processor 128 is always searching, and by the time channel element microprocessor 136 is signaled that the results are available, integrated search processor 128 has started the next search.

Search control block 166 produces the timing signals used to control the searching process performed by integrated search processor 128. Search control block 166 sends the zero offset timing reference to short code I and Q PN generators 202, 206 and long code User PN generator 204, and the enable signal to decimator latch 218 and the select signal to MUX 216 in searcher front end 174. It provides the read and write addresses for PN sequence buffer 176 and even and odd Walsh chip buffers 168 and 170. It outputs the current offset to control the operation of despreader 178. It provides the intra-time slice timing reference for FHT processor engine 120, and determines whether the searching process or the demodulation process uses FHT processor engine 120 by controlling FHT input MUX 124. It provides several pipeline delayed versions of certain internal timing strobes to search result processor control logic 254 of FIG. 12 to allow it to sum search results across a rake of offsets for a number of Walsh symbol accumulations. Search control block 166 provides best result register 250 with the pipelined offset and antenna information corresponding to accumulated energy values stored.

In FIG. 13, system time count 342 is slaved to the zero offset time reference. In the preferred embodiment as previously detailed, the system clock runs at eight times the PN chip rate. There are 256 PN chips in a Walsh symbol, and 6 Walsh symbols in a power control group for a total of $6^x 256^x 8 = 12,288$ system clocks per power control group. Therefore in the preferred embodiment, system time count 342 is comprised of a fourteen bit counter that counts the 12,288 system clocks. The input reference for short code I and Q PN generators 202, 206 and long code User PN generator 204 of FIG. 10 in searcher front end 174 is taken from system time count 342. (Long code User PN generator 204 output is also based on a longer system wide reference which does not repeat for approximately 50 days. The longer system wide reference is not controlled by the searching process and acts as a preset value. The continuing operation based on the preset value is controlled by system time count 342.) The addresses for PN sequence buffer 176 and even and odd Walsh chip buffers 168 and 170 are taken from system time count 342. System time count 342 is latched by latch 328 at the beginning of each time slice. The output of latch 328 is selected via address MUX's 330, 332, and 334 which provide the write addresses corresponding to the current time slice when these buffers are written at some latter time within the time slice.

Offset accumulator 310 keeps track of the offset of the rake element currently being processed. The starting offset as stored in search offset buffer 308 is loaded into offset accumulator 310 at the beginning of each search window. Offset accumulator 310 is decremented with each rake element. At the end of each search rake that is to be repeated for further accumulations, the number of rake elements per search rake as stored in rake width buffer 312 is added back to the offset accumulator to reference it back to the first offset in the search rake. In this way, the searching process again sweeps across the same search rake for another Walsh symbol accumulation. If the searching process has swept across the current search rake on its final Walsh symbol accumulation then offset accumulator 310 is decremented by one by selection of the "−1" input of repeat rake MUX 304 which produces the offset of the first rake element in the next search rake.

The output of offset accumulator 310 always represents the offset of the current rake element being processed and thus is used to control data input to despreader 178. The output of offset accumulator 310 is added by adders 336 and 338 to the intra-time slice timing output of system time count 342 to generate the address sequence within a time slice corresponding to a rake element. The output of adders 336 and 338 is selected via address MUX's 330 and 332 to provide antenna sample buffer 172 read addresses.

The output of offset accumulator 310 is also compared by comparator 326 with the output of system time count 342 to form the offset Walsh symbol strobe which indicates that antenna sample buffer 172 has sufficient valid data for the searching process to begin.

Search rake count 320 keeps track of the number of rake elements remaining to be processed in the current search rake. Search rake count 320 is loaded with the width of the search window as stored in search width buffer 314 at the beginning of a search window. Search rake count 320 is incremented after the processing of the final Walsh symbol accumulation of each search rake is complete. When it reaches its terminal count, all offsets in the search window have been processed. To provide a indication that the end of the current search window is imminent, the output of search rake count 320 is summed by summer 324 with the output of rake width buffer 312. The end of the search window indication marks the time at which antenna sample buffer 172 may begin to be filled with data samples from an alternative antenna in preparation for the next search window without disrupting the contents needed for the current search window.

When channel element microprocessor 136 specifies a search window, it can specify that the search window be performed for a plurality of antennas. In such a case, the identical search window parameters are repeated using samples from a series of antennas. Such a group of search windows is called an antenna search set. If an antenna search set is specified by channel element microprocessor 136, the antenna set is programmed by the value stored in antenna select buffer 348. After the completion of an antenna search set, channel element microprocessor 136 is alerted.

Rake element count 318 contains the number of rake elements left to process in the current search rake. Rake element count 318 is incremented once for each rake element processed and is loaded with the output of rake width buffer 312 when the searching process is in the idle state or upon completion of a search rake.

Walsh symbol accumulation count 322 counts the number of Walsh symbols left to accumulate for the current search rake. The counter is loaded with the number of Walsh symbols to accumulate as stored in Walsh symbol accumulation buffer 316 when the searching process is in the idle state or after completing a search rake sweep on the final Walsh symbol accumulation. Otherwise the counter is incremented with the completion of each search rake.

Input valid count 302 is loaded whenever the input antenna or decimator alignment changes. It is loaded with the minimum number of samples the searching process needs to process a search rake based on the output of rake width buffer 312 (i.e. one Walsh symbol plus one rake width worth of samples). Each time an antenna sample is written to antenna sample buffer 172, input valid count 302 is incremented. When it reaches its terminal count, it sends an enable signal that allows the searching process to begin. Input valid count 302 also provides the mechanism for holding off search processing when the offsets of successive search windows do not allow continuous processing of data.

The searching process operates in either an idle state, a sync state, or an active state. Searcher sequencing control 350 maintains the current state. Integrated search processor 128 initializes to the idle state when a reset is applied to channel element modem 110. During the idle state, all counters and accumulators in search control block 166 load their associated search parameters as presented above. Once channel element microprocessor 136 commands the searching process to begin a continuous or a single step search via the control word, integrated search processor 128 moves to the sync state.

In the sync state, the searching process is always waiting for an offset Walsh symbol boundary. If the data in antenna sample buffer 172 isn't valid yet, or if the power control group alignment bit is set and the Walsh symbol is not a power control group boundary, then integrated search processor 128 remains in the sync state until the proper conditions are met on a subsequent offset Walsh symbol boundary. With a properly enabled offset Walsh symbol, the searching process can move to the active state.

Integrated search processor 128 stays in the active state until it has processed a search rake, at which time it normally returns to the sync state. If integrated search processor 128 is in single step mode, it can go from the active state to the idle state after completing the last rake element for the final Walsh symbol accumulation for the last search rake in the search window. Integrated search processor 128 then waits for channel element microprocessor 136 to initiate another search. If instead, integrated search processor 128 is in continuous mode then at this point it loads the new search parameter set and returns to the sync state to await the offset Walsh symbol at the initial offset to be processed in the new search. The active state is the only state in which the antenna data samples are processed. In the idle or sync states the searching process simply keeps track of time with system time count 342 and continues to write into the PN sequence buffer 176 and antenna sample buffer 172 so that when the searching process does move to the active state these buffers are ready to be used.

Figure 14:
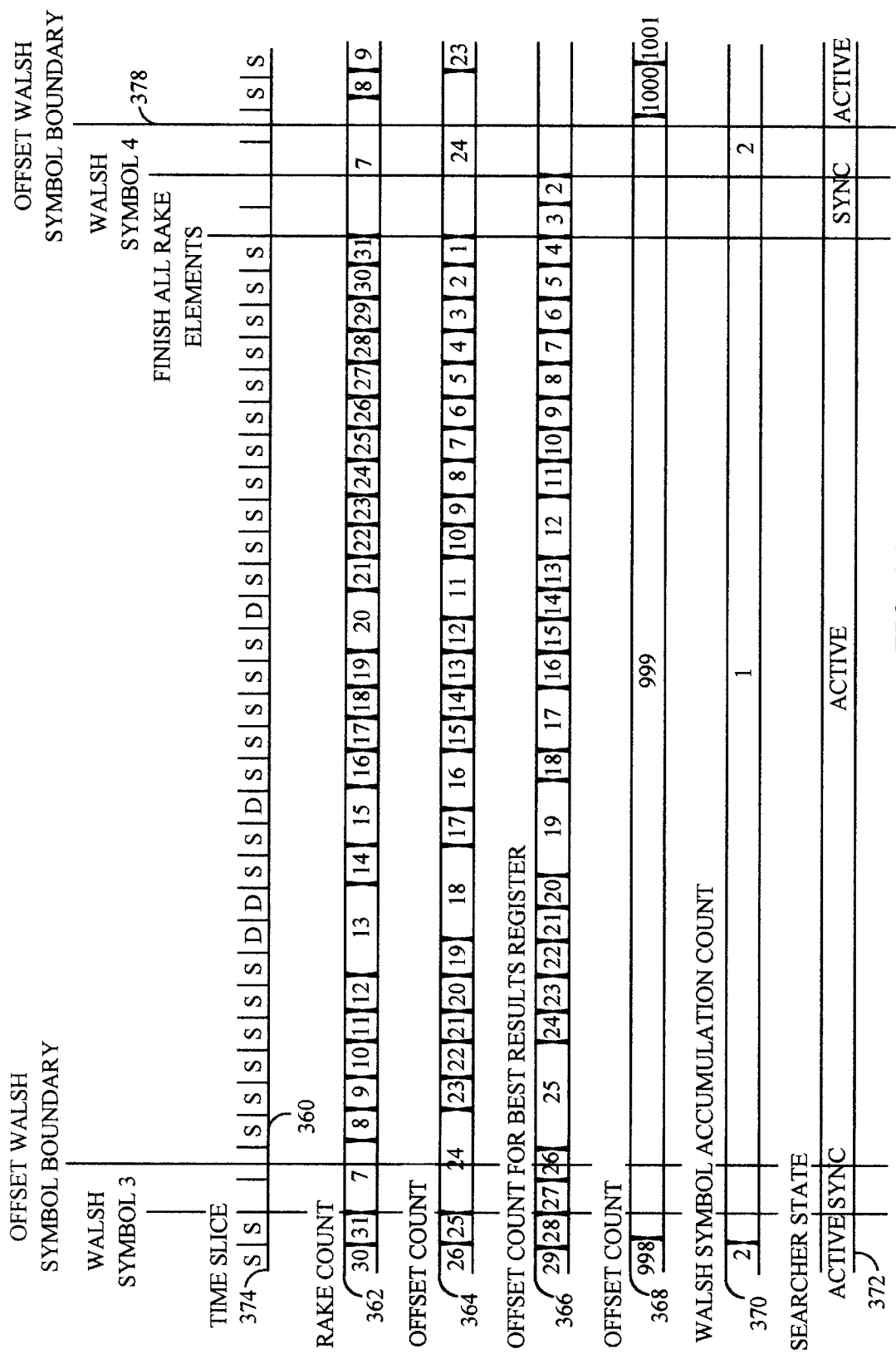
FIG. 14 is a timing diagram showing the processing sequence depicted in FIG. 5, showing the corresponding states of certain control logic elements presented in FIG. 13.

FIG. 14 is an exemplary timing view of the first Walsh symbol accumulation of the second search rake in a search window such as search rake 196 shown in FIG. 9. The third Walsh symbol as referenced to the zero offset reference system time clock is shown divided into thirty-two time slices. Searcher state 372 changes from sync to active when the offset Walsh symbol boundary indication corresponding to Walsh symbol 3 indicates that antenna sample buffer 172 is ready with valid samples to process at that offset. During the next available time slice, the first rake element of the search rake is processed. The searching process continues to use each time slice to process a rack element as indicated by an "S" in time slices 374 unless demod front end 122 uses FHT processor engine 120 as indicated by an "D" in time slices 374. The searching process finishes processing every rake element in the rake and returns to the sync state before the next offset Walsh symbol boundary corresponding to Walsh symbol 4. Also shown is search rake count state 362 being incremented during the active state until it reaches the terminal state, indicating the complete search rake has been processed. Offset count state 364 is shown being incremented between each time slice corresponding to a rake element, so that it may be used to derive the sample buffer offset read address during the time slice. Offset count state 364 is pipelined delayed as offset count for best result register 366. The offset count 368 is incremented on the final Walsh symbol accumulation 370 pass.

Thus, a single integrated searcher processor configuration, by buffering antenna samples and utilizing a time sliced transform processor, can independently sequence through a search as configured by a search parameter set, analyze the results and present a summary report of the best paths to use for demodulation element reassignment. This reduces the searching related workload of the controlling microprocessor so that a less expensive microprocessor can be used, and also reduces the direct IC costs by allowing a complete channel element modem on a single IC.

Figure 15:
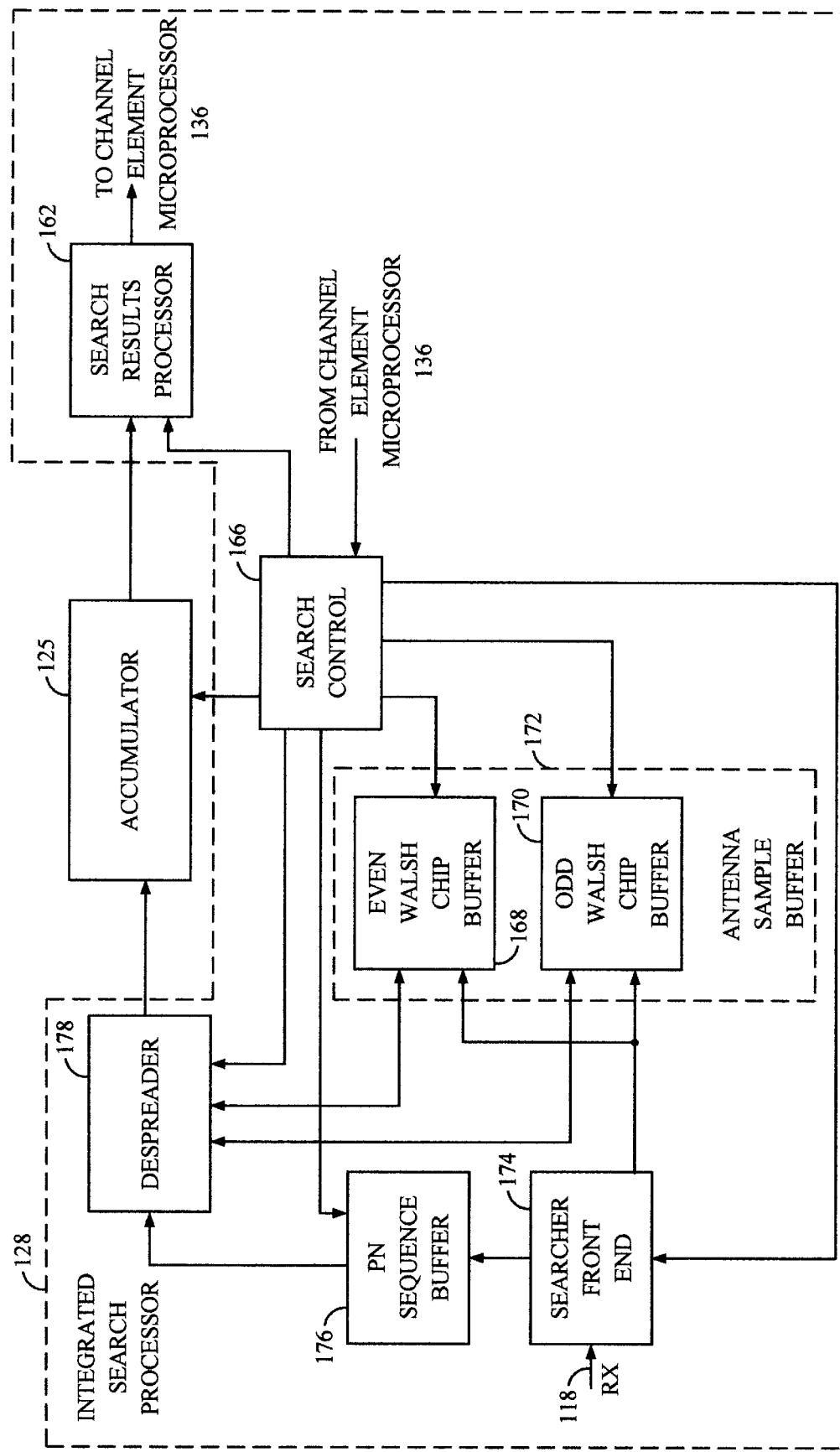
FIG. 15 is an alternative block diagram of the search processor.

The general principles described herein can be used in systems using alternative transmission schemes. The discussion above was based on the reception of a reverse link signal where no pilot signal is available. On the forward link of the preferred embodiment, the base station transmits a pilot signal. The pilot signal is a signal having known data thus the FHT process used to determine which data was transmitted is not necessary. In order to embody the present invention, a integrated search processor for receiving a signal comprising a pilot signal would not contain the FHT processor or maximum detection function. For example FHT processor engine 120 and max detect 160 blocks of FIG. 5 could be replaced with simple accumulator 125 as shown in FIG. 15. The searching operation when a pilot signal is available is analogous to an acquisition mode access channel search operation as described above.

The searching architecture described above can be used to perform searches in a variety of manners. The most efficient search is a linear search. A linear search is performed by linearly searching potential time offsets in order regardless of the probability that the remote unit is transmitting. When searching for a remote unit signal, the base station must know the expected coverage area range. For example a typical base station covers a range of approximately 50 kilometers implying a round trip delay of 350 microseconds or approximately 430 PN chips in the preferred embodiment. Also, in the multipath environment where signals take nondirect paths, the remote unit signal may be delayed as much as twice the direct path propagation implying that searching must be done over a set of nearly 1000 different PN offsets. Once a remote unit's signal has been detected and is being demodulated, the approximate distance of the remote unit is known and the possible PN offsets which need to be searched to ensure that the majority valid multipath signals are detected are greatly reduced.

Within a given search over a power control group, there are three reasons why a signal may not be detected at a given PN offset. First, no signal may be arriving at the given PN offset. A remote unit may provide several multipath signals but the number of multipath signals created is only a very small portion of all the offsets searched. Thus the majority of searched offsets do not produce energy results that exceed the detection threshold precisely because no remote unit signal is present at that offset.

Secondly, the signal may be arriving at the given PN offset but faded during a large portion of the search integration time. As explained above, the multipath characteristic of a radio channel can result in signal fading. Fading is the result of the phasing characteristics of the multipath channel. A fade occurs when multipath vectors are added destructively, yielding a received signal that is smaller than either individual vector. Thus if a signal which is long term valid happens to be in a deep fade at the time the search is made, no signal is available for detection by the searching process.

Thirdly, the signal would have arrived at the given PN offset but for the fact that the transmitter of the remote unit is gated off during the period of time in question. As explained above, in the preferred embodiment the remote unit produces a bursty signal. The remote unit comprises a variable rate vocoder which produces variable rate frames of data. The data burst randomizer determines during which time periods the remote unit transmits and during which time periods it does not transmit given the data rate of the signal to be transmitted, a remote unit specific identifying number, and the time of day. When operating at less than full rate, the data burst randomizer within the remote unit pseudorandomly distributes the active time periods within the transmission burst. A corresponding data burst randomizer is also included in the base station such that the base station can recreate the pseudorandom distribution based on the time of day and the remote unit specific identifying number but the rate information is not available during the searching process. As noted above, the eighth rate time periods determine a so called worthy group of time periods. In this way, regardless of the data rate of the transmitted signal, each time period corresponding to the worthy group is sure to correspond to a time when the corresponding remote unit was transmitting a signal. During all other time periods, the remote unit may or may not be transmitting depending on the corresponding encoding rate.

When a linear search is specified, in order to obtain valid power measurements, the searching process confines the search integration time (i.e. the number of Walsh accumulations at a single search offset) to begin and end within a single power control group as explained in greater detail above. A search that integrates only within a single power control group is said to be synchronized with the power control group boundaries. If the searching process at a given offset were accumulated without regard to power control group boundaries and the remote unit were transmitting at less than full rate, valid search results corresponding to a power control group where the remote unit's signal is gated on may be summed with noise accumulated during a subsequent power control group that remote unit's signal is gated off. The summation of the search results corresponding to the power control group where the remote unit's signal is gated off corrupt the otherwise valuable results accumulated during the power control that the remote unit's signal is gated on.

One method of searching would be to search only those power control groups corresponding to worthy groups. Even if such worthy group only searching is performed, the searching process and demodulation element assignment process must still be capable of handling the situation in which the energy accumulated does not exceed the detection threshold but in reality a signal is present at the offset due to the unpredictable fading characteristics of the channel. Therefore a more efficient scheme is to accumulate energy in all power control groups whether or not they correspond to worthy groups. If energy is detected in a search which does not correspond to a worthy group, an additional valid data point is generated over and above what would be generated based on a worthy group only search.

As noted above, a preamble search and a search performed during traffic channel operation are different. When a remote unit initially attempts to access the system, it sends a beacon signal called a preamble using the Walsh zero symbol. Walsh zero symbol is the Walsh symbol which contains all logical zeros instead of half ones and zeroes as described above. When a preamble search is performed, the searcher looks for any remote unit sending a Walsh zero symbol beacon signal on an access channel. In the preferred embodiment, the transmission of the preamble is always full rate and is never gated off. Therefore during a preamble search there is no need for synchronization with the power control group boundaries.

There are many configurations for spread spectrum multiple access communication systems not specifically described herein but with which the present invention is applicable. For example, other encoding and decoding means could be used instead of the Walsh encoding and FHT decoding. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of receiving a signal comprised of a group of spread spectrum signals sharing a common frequency band and isolating a first signal from among said group of spread spectrum signals to determine a signal strength at a path delay time offset from a zero offset reference time of said first signal wherein said first signal comprises a series of symbols wherein a portion of said series of said symbols are grouped together in a symbol set wherein each symbol in a common symbol set is transmitted at a fixed power level wherein successive symbol sets may be transmitted at a variety of signal levels wherein said variety of signal levels includes a zero level wherein transmission of said first signal is gated off, said method comprising the steps of:

searching a first set of call signal samples corresponding to a first symbol set for said first signal at a first offset to produce a first power estimate thereof;

searching a second set of call signal samples corresponding to said first symbol set for said first signal at said first offset to produce a second power estimate thereof;

summing said first and second power estimates to produce a symbol set power level estimate at said first offset;

searching a third set of call signal samples corresponding to a second symbol set for said first signal at a second offset to produce a third power estimate thereof;

searching a fourth set of call signal samples corresponding to said second symbol set for said first signal at said second offset to produce a fourth power estimate thereof; and summing said third and fourth power estimates to produce a symbol set power level estimate at said second offset;

wherein said first symbol set and said second symbol set correspond to time contiguous symbol sets and wherein said steps of searching are performed continually.

2. The method of claim 1 wherein said first set of call signal samples comprises two Walsh symbols.

3. The method of claim 2 wherein said second set of call signal samples comprises two Walsh symbols.

4. The method of claim 1 wherein said third set of call signal samples comprises two PN chips.

5. The method of claim 4 wherein said fourth set of call signal samples comprises two PN chips.

6. The method of claim 1 further comprising detection of at least one maximum demodulated energy value.

\* \* \* \* \*